(12) United States Patent
Hebert

(10) Patent No.: US 7,980,160 B2
(45) Date of Patent: Jul. 19, 2011

(54) DEEP THROAT CHUCK JAW SYSTEM

(76) Inventor: Jacques Hebert, Jeanerette, LA (US)

( * ) Notice: Subject to any disclaimer, the term of this patent is extended or adjusted under 35 U.S.C. 154(b) by 607 days.

(21) Appl. No.: 12/038,951

(22) Filed: Feb. 28, 2008

(65) Prior Publication Data

US 2008/0203683 A1  Aug. 28, 2008

Related U.S. Application Data

(60) Provisional application No. 60/892,236, filed on Feb. 28, 2007.

(51) Int. Cl.
*B23B 31/16* (2006.01)
*B23B 23/04* (2006.01)
(52) U.S. Cl. ........................................................ 82/150
(58) Field of Classification Search .................. 82/142, 82/152, 155, 150; 279/110, 123, 152
See application file for complete search history.

(56) References Cited

U.S. PATENT DOCUMENTS

| | | | | |
|---|---|---|---|---|
| 2,707,107 A * | 4/1955 | Tucker | ............... | 279/2.1 |
| 3,199,881 A | 8/1965 | Duxbury | | |
| 3,244,430 A * | 4/1966 | Buck | ............... | 279/121 |
| 3,252,710 A * | 5/1966 | Buck | ............... | 279/121 |
| 3,679,221 A * | 7/1972 | Behrens | ............... | 279/153 |
| 3,945,652 A | 3/1976 | Hohwart et al. | | |
| 4,041,612 A | 8/1977 | Skubic | | |
| 4,114,910 A * | 9/1978 | Reeder | ............... | 279/123 |
| 4,631,995 A | 12/1986 | Vroenen | | |
| 4,696,482 A | 9/1987 | Brown | | |
| 4,772,034 A | 9/1988 | Brown | | |
| 5,052,254 A | 10/1991 | Goins | | |
| 5,443,275 A | 8/1995 | Knobl et al. | | |
| 5,984,321 A * | 11/1999 | Gruttadauria | ............... | 279/123 |

* cited by examiner

*Primary Examiner* — Will Fridie, Jr.
(74) *Attorney, Agent, or Firm* — Raymond G. Areaux; Ian C. Barras; Carver, Darden, Koretzky, Tessier, Finn, Blossman & Areaux, LLC

(57) ABSTRACT

A deep throat chuck jaw system adapted to be used with a lathe with or without a headstock hole is provided. The system includes a set of jaw extension members having an inboard end supported from a face of a master chuck jaw coupled to a lathe chuck. The jaw extension members also include an outboard end. The set of jaw extension members are operable to grip an outer surface of a part having an outer diameter greater than the headstock hole with a clamping assembly clamped around the outboard end.

70 Claims, 26 Drawing Sheets

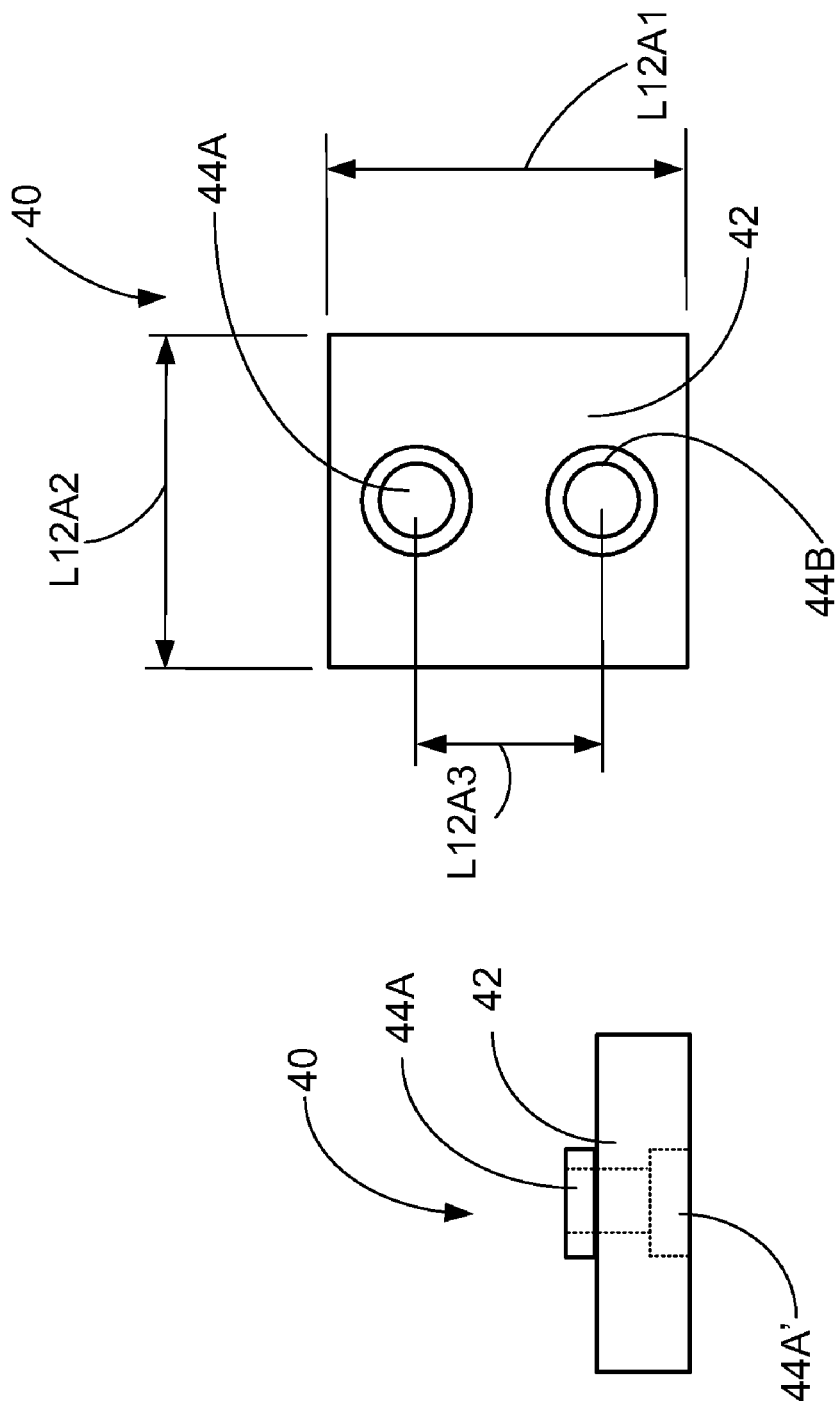

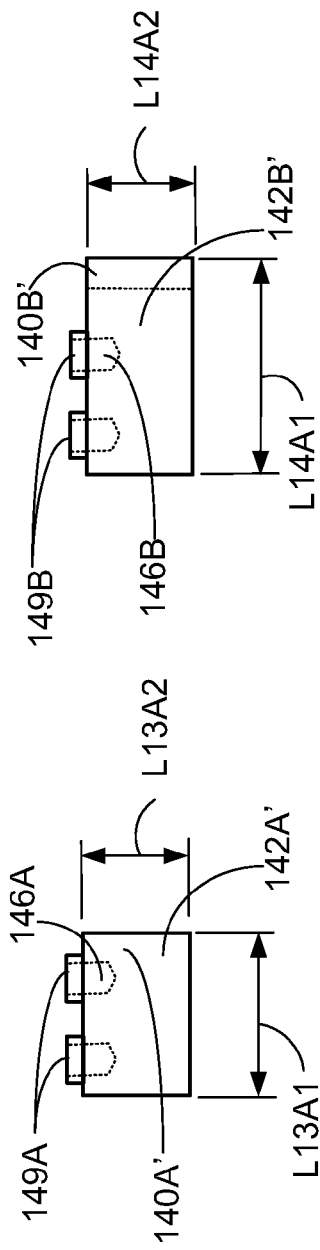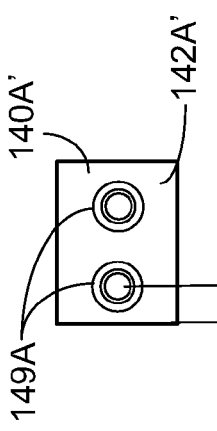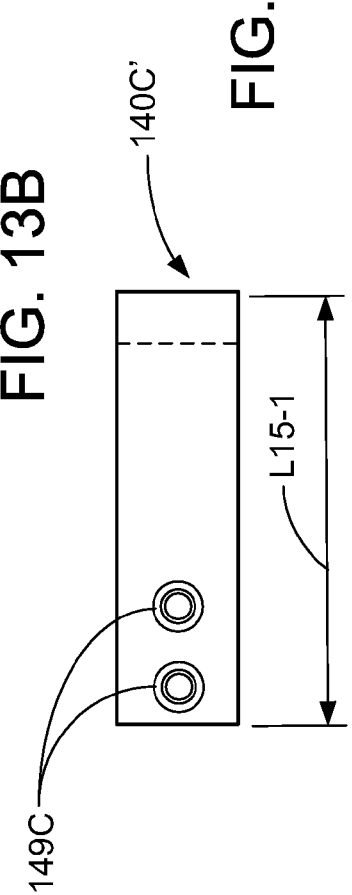

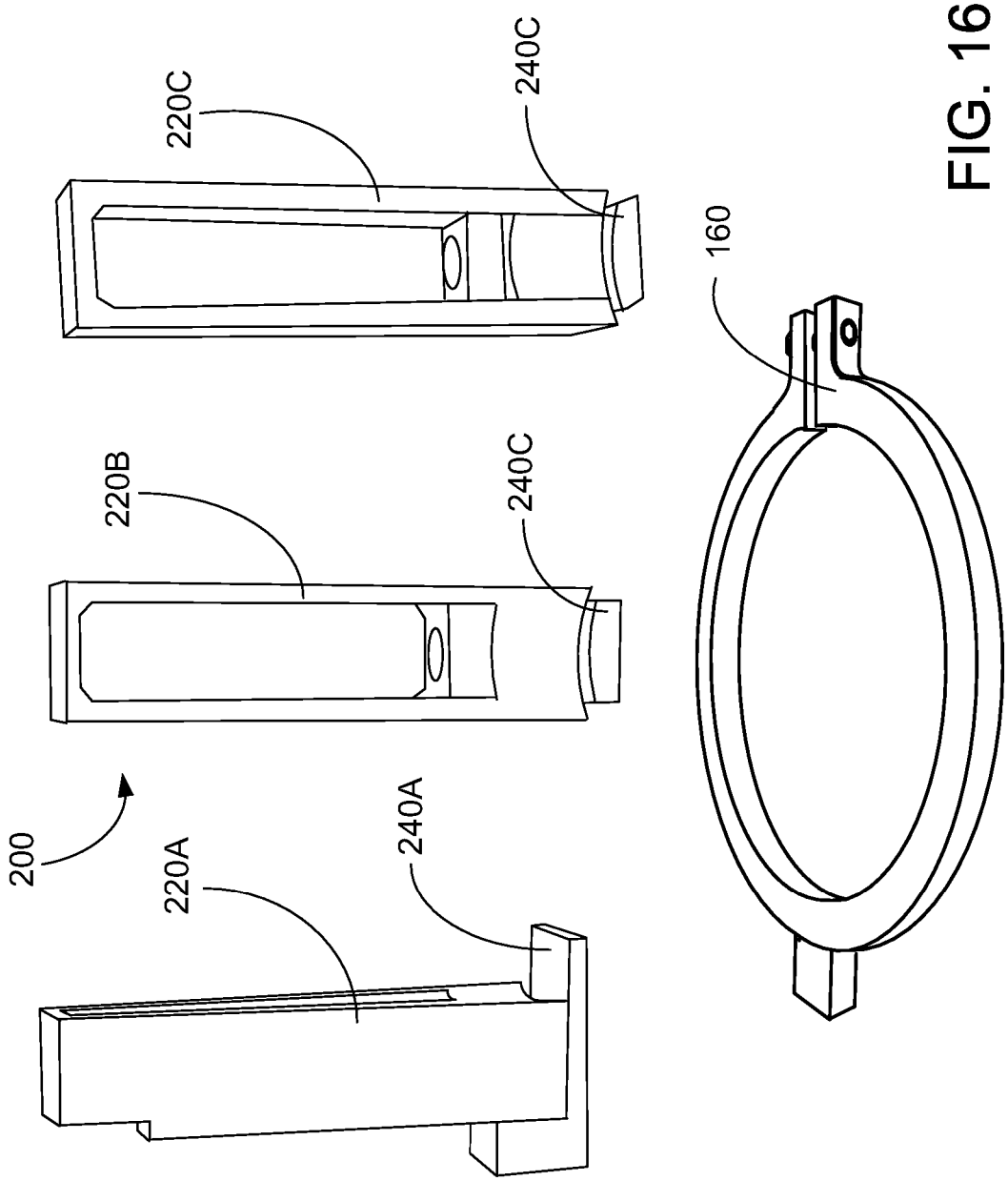

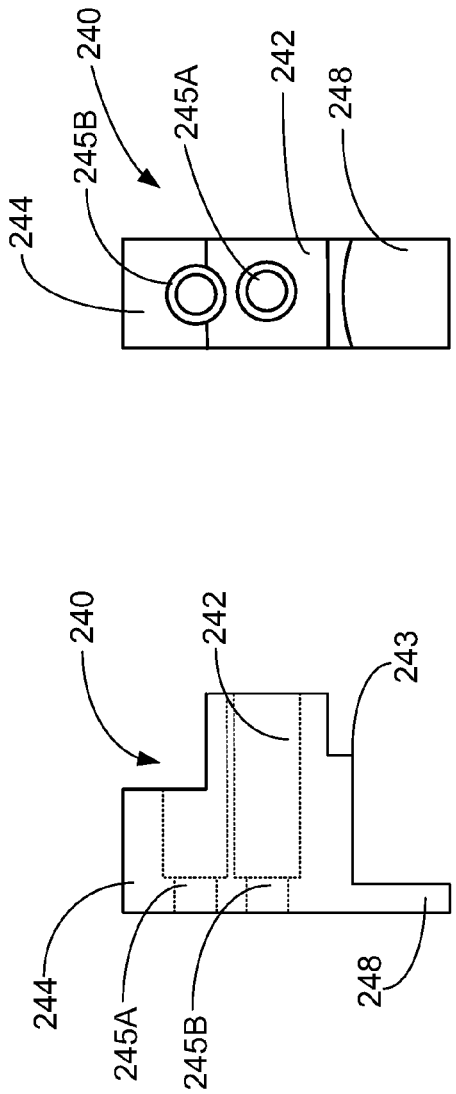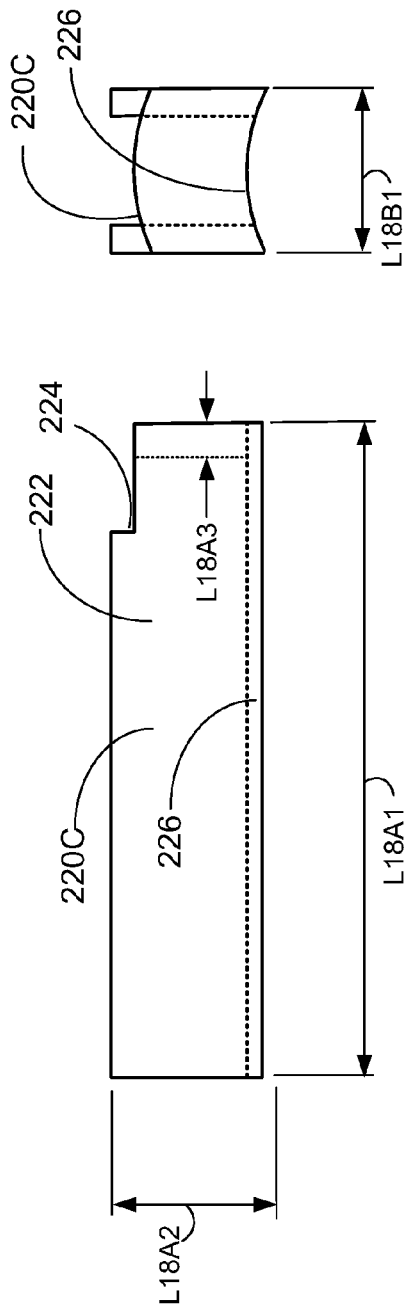

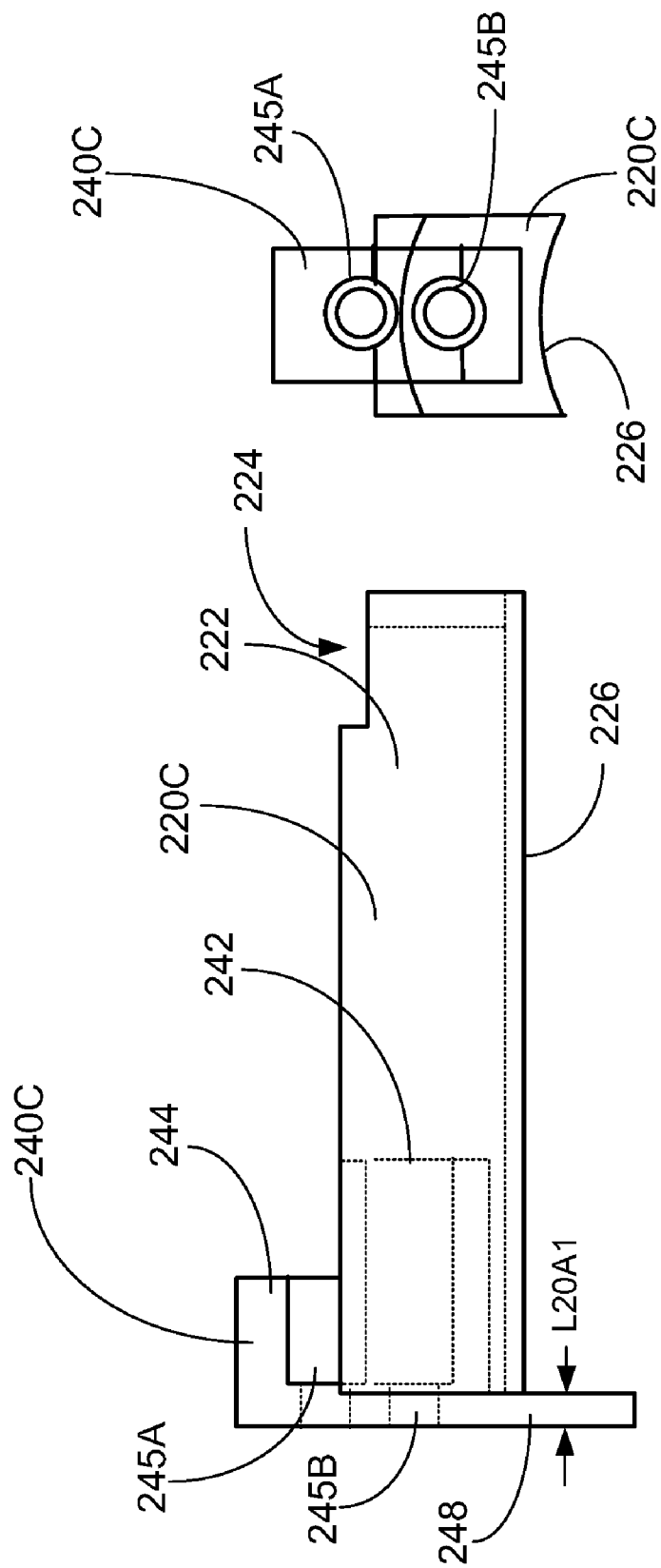

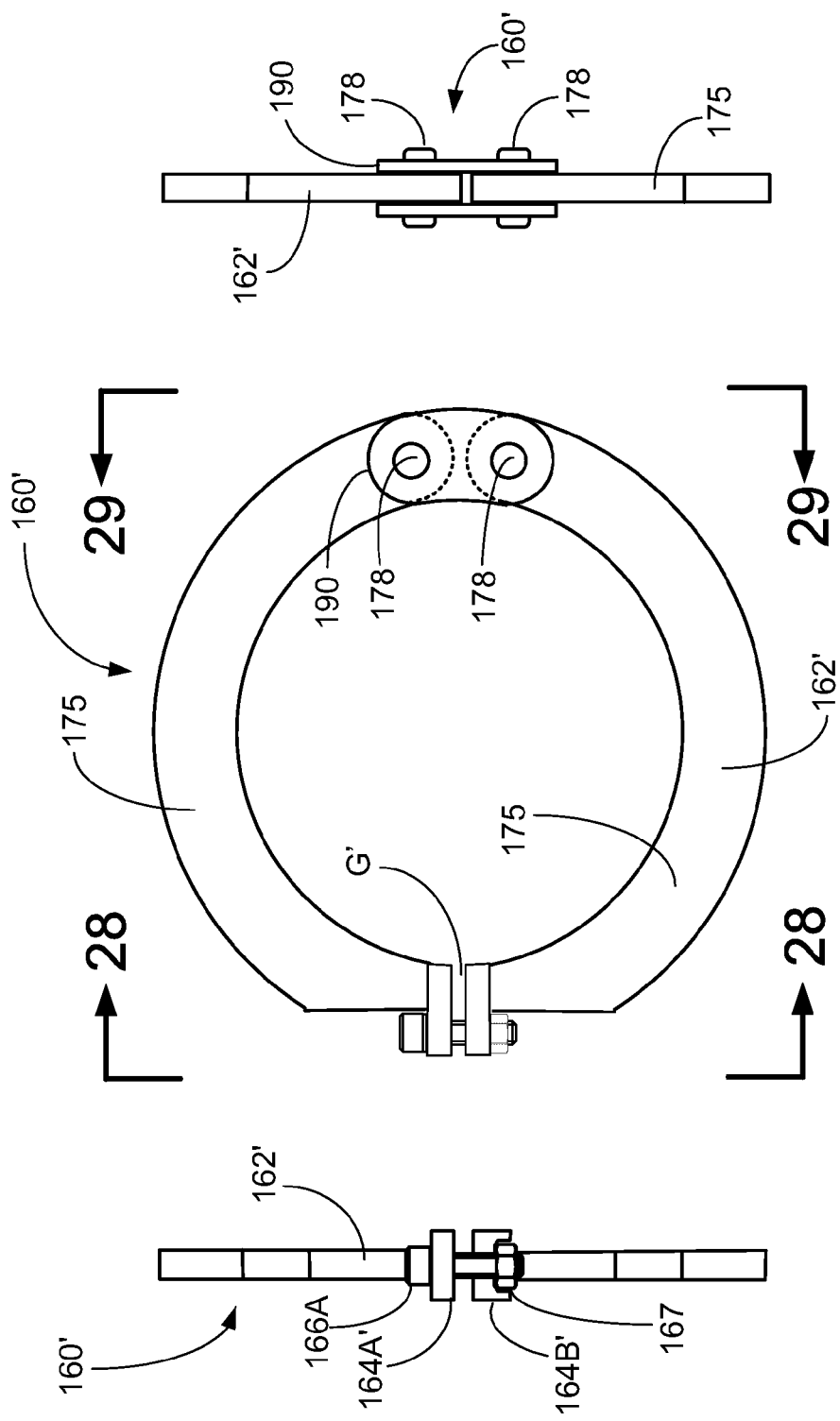

000
DEEP THROAT CHUCK JAW SYSTEM

CO-PENDING APPLICATIONS

This invention claims priority benefit of provisional application Ser. No. 60/892,236 filed on Feb. 28, 2007 and incorporated herein by reference as if set forth in full below.

BACKGROUND OF THE INVENTION

I. Field

The present disclosure relates generally to lathe chuck devices and, more specifically, to a deep throat chuck jaw system which allows engine lathes to manufacture parts larger than the headstock hole can swallow without the use of any conventional outboard support.

II. Background

The issue of the headstock hole creating limits on the range of a lathe has plagued the machining and manufacturing industries since their inception. Every time a part needs to be manufactured that is too large to fit into the lathe's headstock hole, the options available to manufacture the part are very limited and all have severe drawbacks. Various outboard support devices have been employed to compensate for the lathe's headstock hole size.

The use of a conventional steady rest 1, such as shown in FIGS. 1, 2 and 3, reduces the maximum surface feet that a part can be worked. In other words, the part cannot be spun at the correct RPM for efficient machining. The steady rest 1 is large, cumbersome, has numerous moving parts that fail and reduces the work space maneuverability. A steady rest 1 also requires a "true" spot to be machined on the outside diameter of the part which is often not allowed by the customer. Furthermore, production using a steady rest 1 can be slower.

Another device includes a live bell center 4, as best seen in FIGS. 4 and 5. The use of a live bell center 5 prevents face and inside diameter machine work altogether. A tail stock 3 is shown in line supporting the live bell center 4.

Bored long jaws on a slight taper are sometimes used. However, the bored long jaws are slightly smaller on the outboard end of the jaws and apply more pressure to the outboard end of the part being machined. This practice does not allow for sufficient gripping on the part for efficient machining. It also applies undesirable loads on the lathe chuck.

Another device is a hollow spindle lathe which is very expensive. The hollow spindle lathe is also limited by the size of the headstock hole. The maximum size part that can be machined cannot be larger than the headstock hole. Furthermore, the hollow spindle lathes cannot develop enough RPMs to machine smaller parts efficiently.

There is therefore a need for a system to resolve "the headstock hole" issue by increasing the effective range of parts that can be machined with a deep throat chuck jaw system.

SUMMARY OF THE INVENTION

The present invention solves the aforementioned problems with a deep throat chuck jaw system.

The deep throat chuck jaw system of the present invention is adapted to be used with any lathe with or without a headstock hole. The system includes a set of jaw extension members having an inboard end supported from the face of the jaw carriers of a lathe chuck. The jaw extension members also include an outboard end. The set of jaw extension members are operable to grip an outer surface of a part having an outer diameter greater than the headstock hole with a clamping assembly clamped around the outboard end.

Another object of the invention is a kit comprising a first set of jaw extension members having an inboard end supported from a face of a master chuck jaw coupled to a lathe chuck and an outboard end, the set of jaw extension members being operable to grip an outer surface of a part having a first part length and an outer diameter less than an outer diameter of the lathe chuck. The kit includes a second set of jaw extension members having an inboard end supported from a face of a master chuck jaw coupled to a lathe chuck and an outboard end, the set of jaw extension members being operable to grip an outer surface of a part having a second part length smaller than the first part length and an outer diameter less than the outer diameter of the lathe chuck. The kit also includes at least one clamping assembly operable to clamp around the outboard end.

The present invention also contemplates a kit for use with a lathe with a headstock hole. The kit includes a first set of jaw extension members having an inboard end supported from a face of a master chuck jaw coupled to a lathe chuck and an outboard end, the set of jaw extension members being operable to grip an outer surface of a part having a first part length and an outer diameter greater than the headstock hole and less than an outer diameter of the lathe chuck. The kit includes a second set of jaw extension members having an inboard end supported from a face of a master chuck jaw coupled to a lathe chuck and an outboard end, the set of jaw extension members being operable to grip an outer surface of a part having a second part length smaller than the first part length and an outer diameter greater than the headstock hole and less than the outer diameter of the lathe chuck. Moreover, the kit includes at least one clamping assembly operable to clamp around the outboard end.

An object of the present invention is to provide a deep throat chuck jaw system that has no moving parts which can fail.

An object of the present invention is to provide a deep throat chuck jaw system that firmly retains the parts being machined in the optimal position for efficient machining.

A further object of the present invention is to provide a deep throat chuck jaw system that allows a smaller lathe to machine parts too large to swallow in the available headstock hole and at considerable distances from the chuck previously unachievable without some type of outboard support.

A still further object of the present invention is to provide a deep throat chuck jaw system that allows for face work, inside diameter work and some outside diameter work.

A still further object of the present invention is to provide a deep throat chuck jaw system that adds radial support to thin wall parts eliminating part ringing or vibration when machining.

In view of the above objects, it is a feature of the present invention to provide a deep throat chuck jaw system that is a very useful and user-friendly tool that drastically expands the use (part range) of any lathe with a headstock hole too small for the part to be machined.

A further feature of the present invention is to provide a deep throat chuck jaw system that can be utilized on a hollow spindle lathe, thereby increasing its capacity and usability.

A still further feature of the present invention is to provide a deep throat chuck jaw system that can be utilized on a Vertical Turning Lathe and manual lathes.

A still further feature of the present invention is to provide a deep throat chuck jaw system that can be used in some milling operations.

A still further feature of the present invention is to provide a deep throat chuck jaw system that can be sized for use on almost any chuck (e.g., hydraulically actuated, pneumatically actuated or manually actuated).

A still further feature of the present invention is to provide a deep throat chuck jaw system that can be used with three (3), four (4) or six (6) jaw chucks.

Additional aspects will become more readily apparent from the detailed description, particularly when taken together with the appended drawings.

BRIEF DESCRIPTION OF THE DRAWINGS

For a further understanding of the nature and objects of the present invention, reference should be had to the following description taken in conjunction with the accompanying drawings in which like parts are given like reference numerals.

FIGS. 12A and 12B show top and end views of a shim.

FIGS. 13A and 13B show side and top views of a machineable soft jaw piece of a first length.

FIGS. 14A and 14B show side and top views of a machineable soft jaw piece of a second length.

FIG. 15 shows a top view of a machineable soft jaw piece of a third length.

FIG. 16 shows a third embodiment of the deep throat chuck jaw system in accordance with the present invention.

FIGS. 18A and 18B show side and end views of the non-universal flatbar jaw extension member.

FIGS. 19A and 19B show side and end views of the machineable lathe chuck jaw.

FIGS. 20A and 20B show an arrangement of a machineable lathe chuck jaw and a non-universal flatbar jaw extension member.

FIG. 27 shows a clamping assembly.

FIG. 28 shows a view along the plane 28-28 of FIG. 27.

FIG. 29 shows a view along the plane 29-29 of FIG. 27.

DETAILED DESCRIPTION OF THE INVENTION

Figure 1:
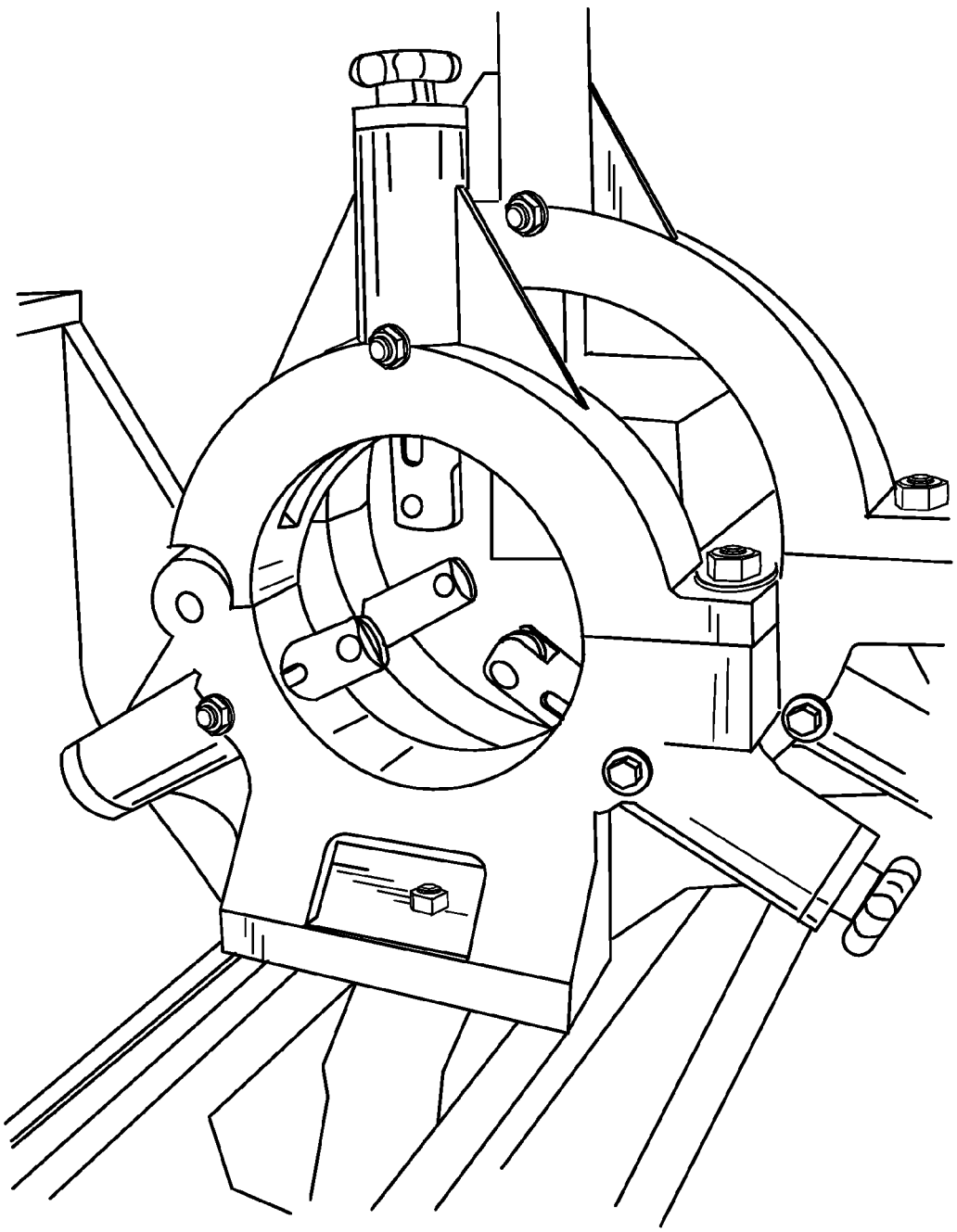
FIG. 1 shows a front perspective view of conventional steady rests.
Figure 2:
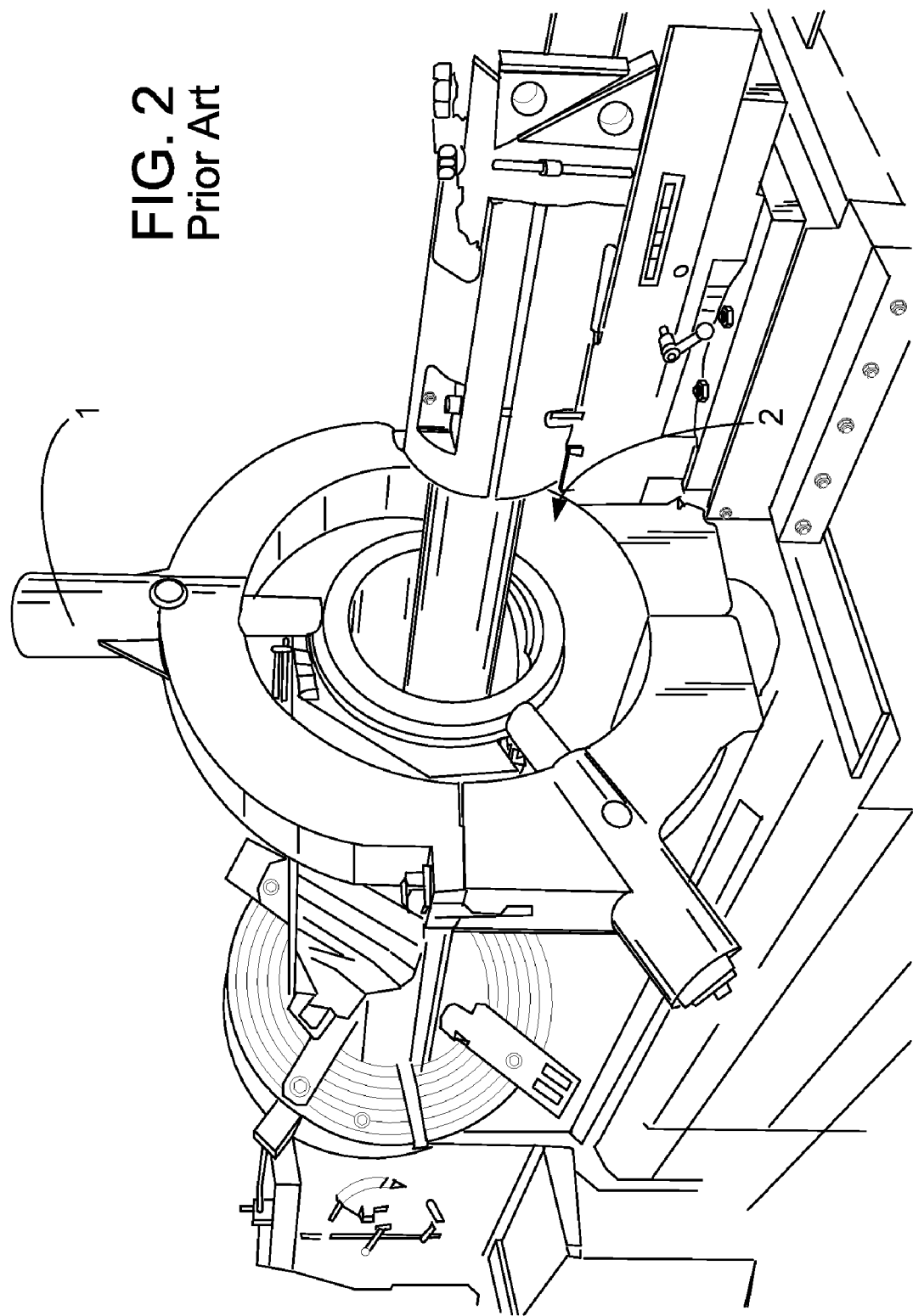
FIG. 2 shows a front perspective view of a conventional steady rest with a boring bar.
Figure 3:
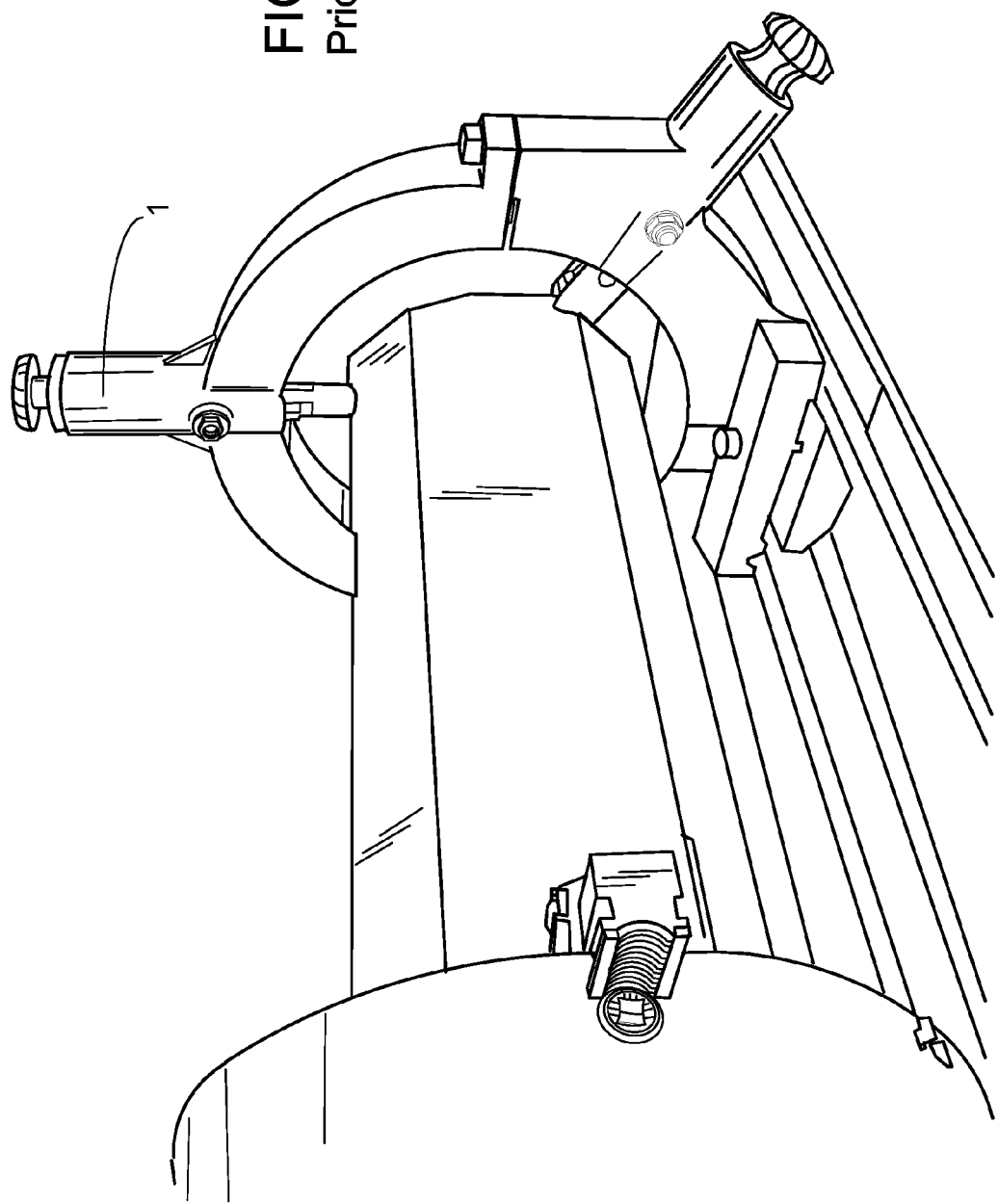
FIG. 3 shows a rear perspective view of a conventional steady rest.
Figure 4:
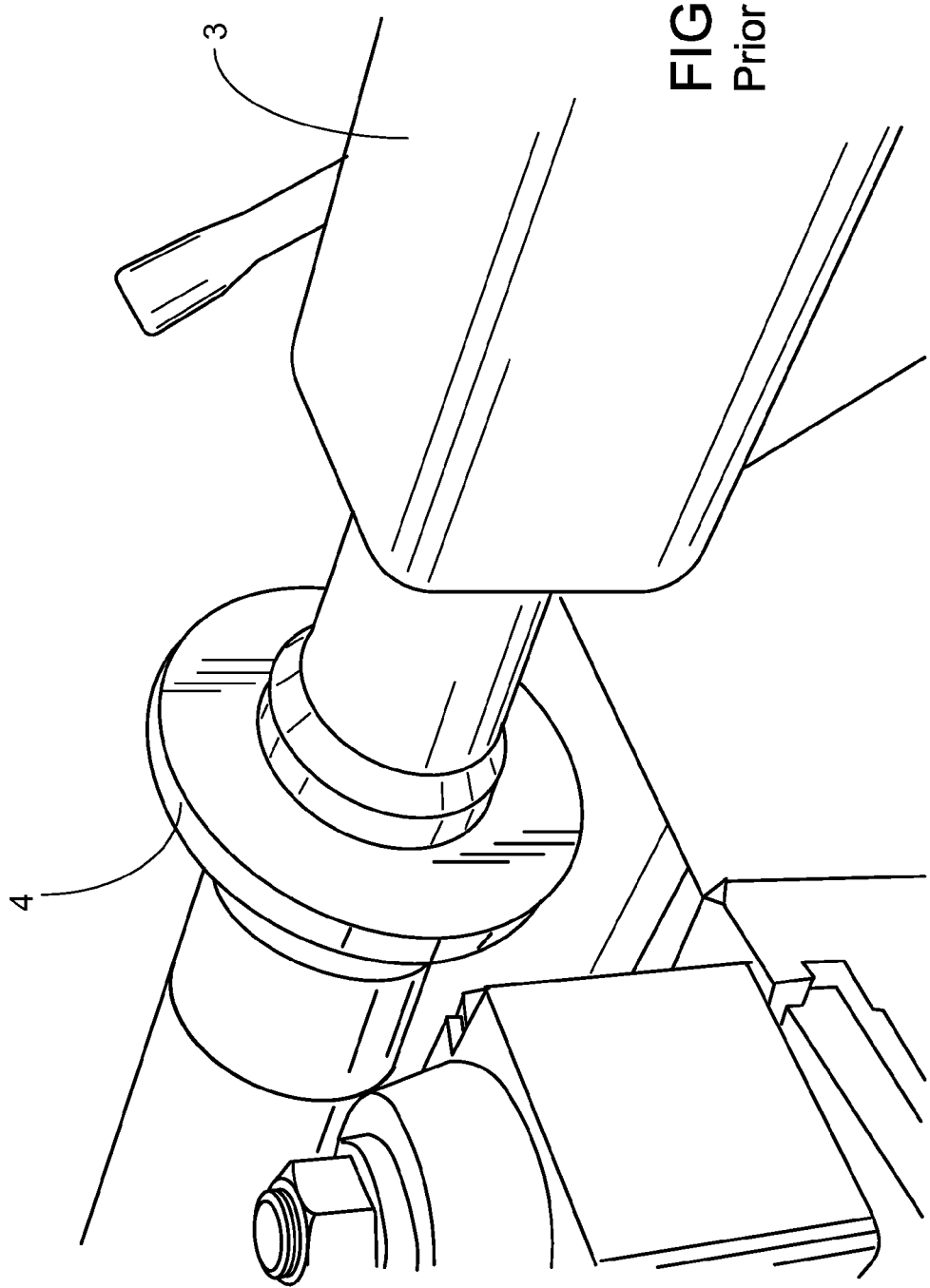
FIG. 4 shows a front perspective view of a conventional live bell center with a tail stock.
Figure 5:
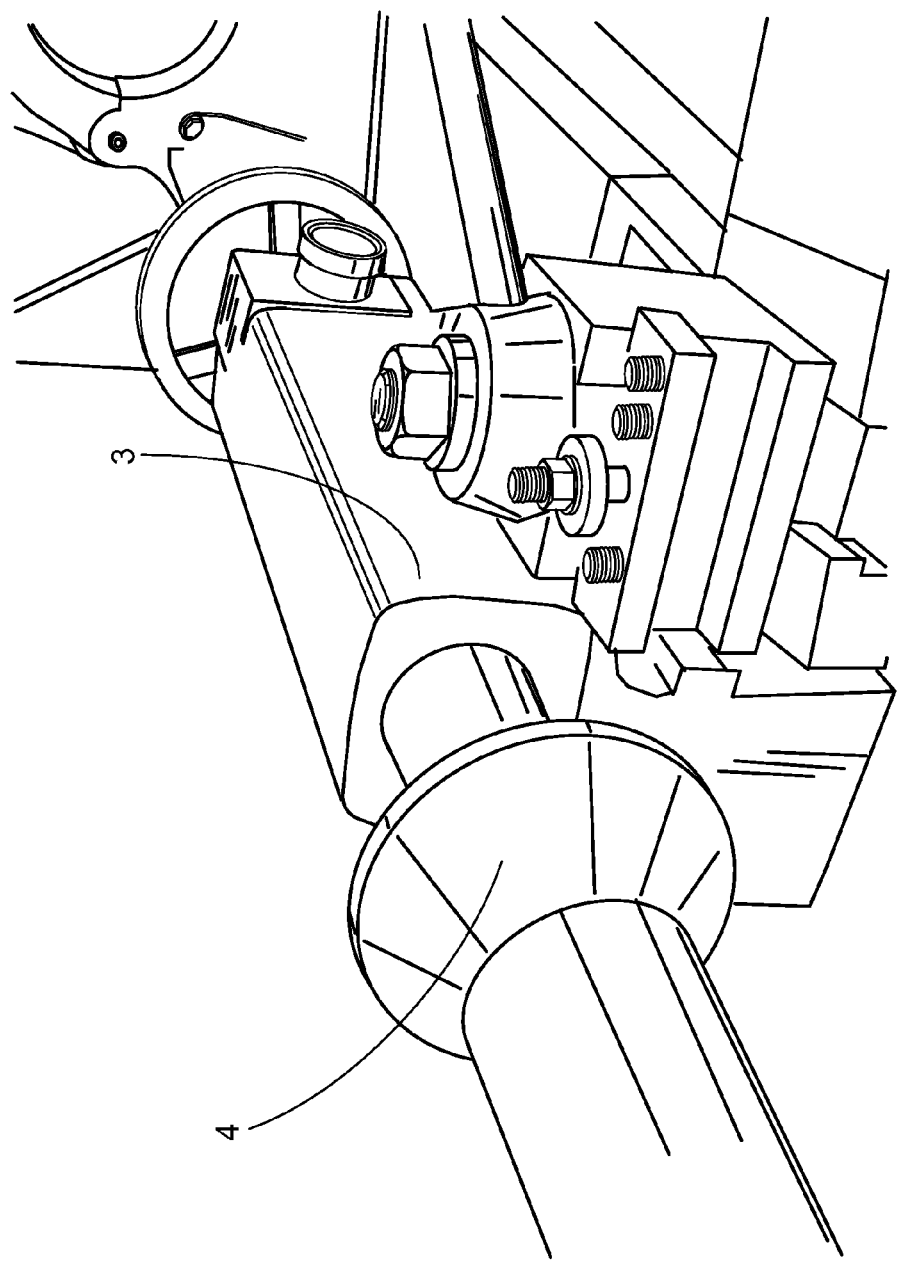
FIG. 5 shows a rear perspective view of a conventional live bell center with a tail stock.
Figure 6A:
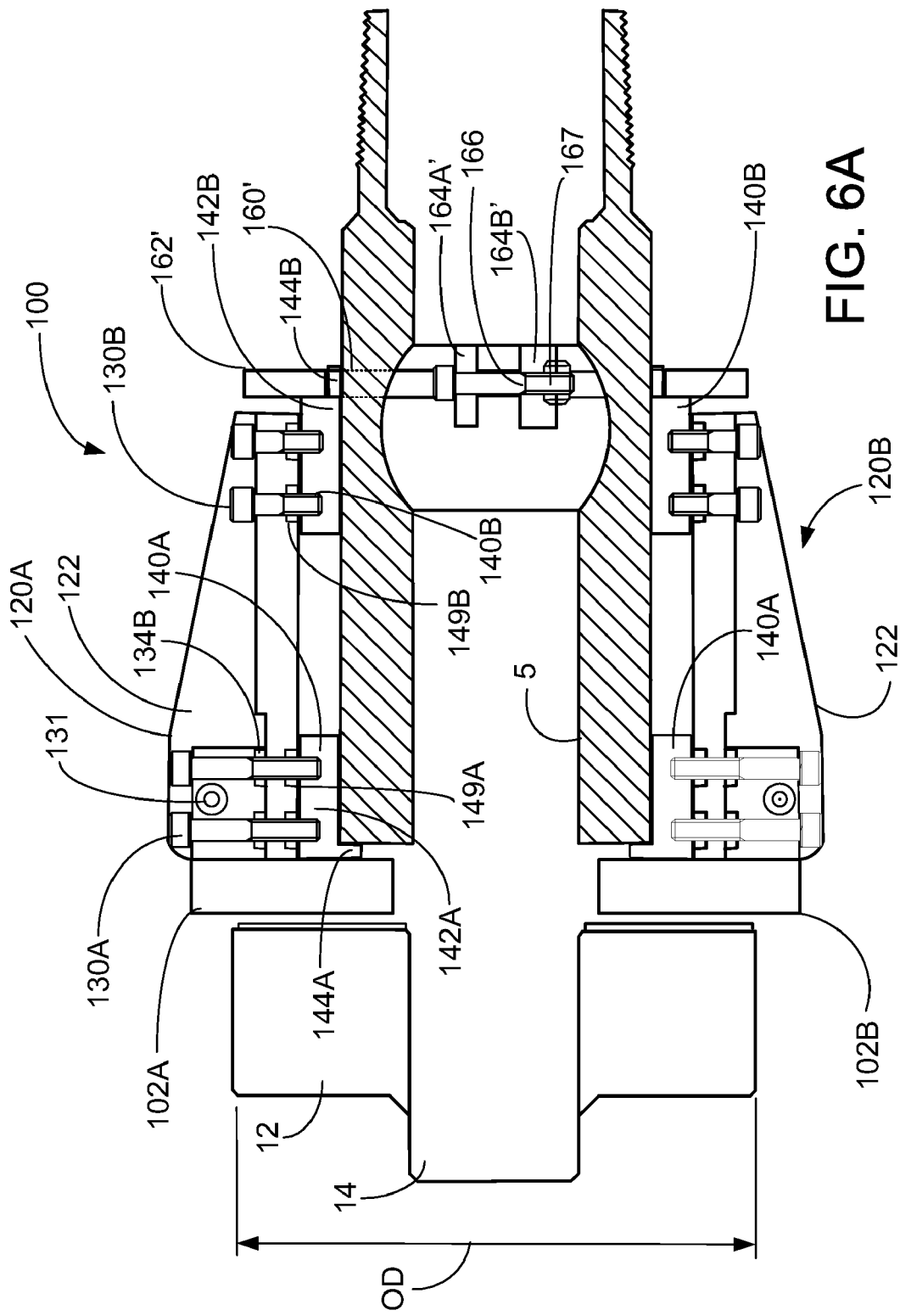
FIG. 6A shows a cross-sectional view of a first embodiment of the deep throat jaw system in accordance with the present invention.
Figure 6B:
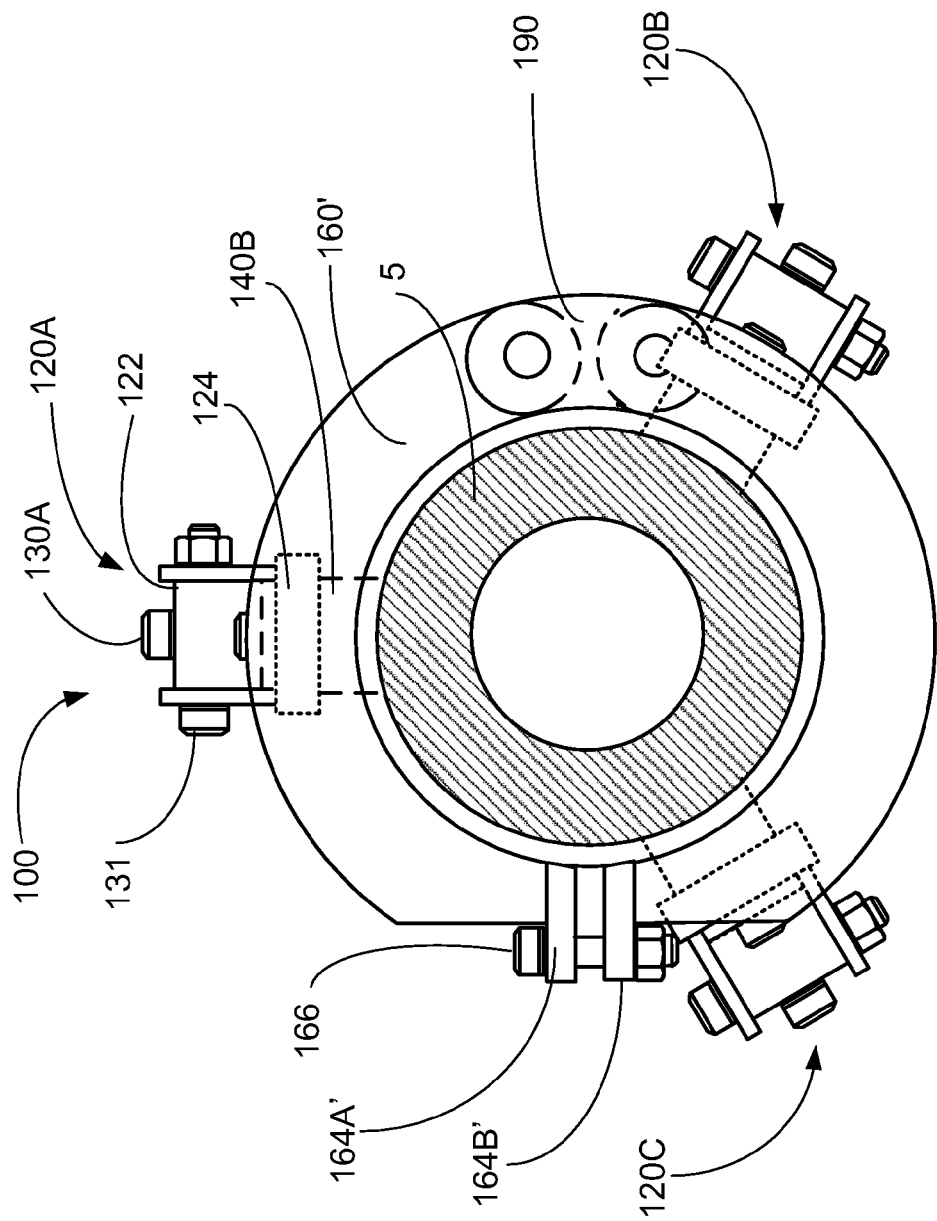
FIG. 6B shows an end view of a first embodiment of the deep throat chuck jaw system in accordance with the present invention.

Referring now to the figures and more particularly to FIGS. 6A and 6B, side and end views of the deep throat chuck jaw system are shown. The deep throat chuck jaw system is generally designated at reference numeral 100. The deep throat chuck jaw system 100 is constructed and arranged to be used with a lathe having a lathe chuck 12. The lathe chuck 12 has a headstock hole 14 intended to receive or swallow an end of the part to be machined, denoted as 5. The part 5 to be machined has a circumference or diameter greater than the circumference or diameter of the headstock hole 14. The deep throat chuck jaw system 100 also effectively extends the operating size of the lathe to machine parts of a diameter greater than the size of the headstock hole 14. The deep throat chuck jaw system 100 effectively extends the operating size of the lathe to machine parts of a length greater than the size provided for without additional outboard support.

The deep throat chuck jaw system 100 includes a set of master chuck jaws (only 102A and 102B shown) having fastened thereto a set of extension arms 120A, 120B and 120C for movement with the master chuck jaw 102. In this embodiment, the set of master chuck jaws includes three master chuck jaws. Each extension arm 120A, 120B and 120C is arranged to have a pair of machineable soft jaws 140A and 140B fastened thereto via pairs of bolts 130A and 130B, respectively. In the embodiment of FIG. 6A, there are two machineable soft jaws 140A and 140B on each extension arm 120A, 120B and 120C. The length of the extension arm 120A, 120B and 120C may be increased. Therefore, more than two machineable soft jaws may be provided per extension arm.

As can be appreciated, the number of extension arms equals the number of master chuck jaws. Thus, the system 100 can have as many extension arms as master chuck jaws that can be connected to the chuck 12.

The first machineable soft jaw 140A is an inboard machineable soft jaw. The inboard machineable soft jaw 140A has a primary block section 142A with a tab 144A which extends perpendicularly and below the bottom surface of the primary block section 142A to form a generally L-shaped structure. The tab 144A is arranged to abut a face of the master chuck jaw 102A on one side and an end of the part 5 to be machined on the other side. The bottom surface is oriented to extend along the outer circumferential surface of part 5. The bottom surface is concaved to track the curvature of the outer circumferential surface of part 5. The first machineable soft jaw 140A includes a pair of top hub members 149A.

With reference to FIGS. 13A and 13B, the inboard machineable soft jaw piece before machining to fit the part 5, denoted as 140A', has a length L13A1 of approximately 3.0 inches and a height L13A2 of approximately 1.75 inches. After machining, as described later, the inboard machineable soft jaw 140A resembles the structure set forth in FIG. 6A.

The inboard machineable soft jaw piece 140A' has a pair of recessed holes 146A in the top surface. Each hole 146A is aligned under a respective one of the top hub members 149A integrated with the top surface of the primary block section piece 142A'. The first hole closest to the face to nearly abut the master chuck 102A is approximately 0.7 inches from the edge (inboard edge) (L13B1). The height of the hub member 149A is approximately 0.25 inches. During manufacturing, the primary block section piece 142A' is machined to create the tab 144A and concaved bottom surface. The dimensions described herein are for the exemplary embodiment illustrated herein, However, the length or other dimensions of the inboard machineable soft jaw piece 140A' can be varied based on the length and diameter of the part 5 and/or the length of the extension arms 120A, 120B and 120C.

The general angle between the tab 144A and the bottom surface of the inboard machineable soft jaw 140A forms an inboard shoulder to abut thereto an end of the part 5.

The second machineable soft jaw 140B is an outboard machineable soft jaw. The outboard machineable soft jaw 140B has a primary block section 142B with a tab 144B. The tab 144B has a lower profile than the primary block section 142B and extends the length thereof past the outboard end of the extension arms 120A, 120B and 120C. The bottom surface of the primary block section 142B and the tab 144B ride along the outer circumferential surface of part 5. The bottom surface is concaved to track the curvature of the outer circumferential surface of part 5. The second machineable soft jaw 140B includes a pair of top hub members 149B.

With reference to FIGS. 14A and 14B, the outboard machineable soft jaw piece before machining to fit the part 5, denoted as 140B', has a length L14A1 of approximately 4.0 inches with a height L14A2 of approximately 1.75 inches. After machining, as described later, the outboard machineable soft jaw 140B resembles the structure set forth in FIG. 6A. The outboard machineable soft jaw piece 140B' has a pair of recessed holes 146B in the top surface. Each hole 146B is aligned with a top hub member 149B integrated with the top surface of the primary block section piece 142B'. The first hole closest to the inboard edge is approximately 0.7 inches from said inboard edge (L14B1). The height of the hub member 149A is approximately 0.25 inches.

The bottom surface of the outboard machineable soft jaw 140B is a concaved bottom surface, as best seen in FIG. 6B. The dimensions described herein for the outboard machineable soft jaw piece 140B' are for illustrative purposes. However, the lengths and other dimensions of the inboard machineable soft jaw piece 140B' can be varied based on the length and diameter of the part 5 and/or the length of the extension arms 120A, 120B and 120C.

The manufacture of the soft jaws 140A and 140B includes a plurality of saw cut (2.0 in.×2.0 in.) square bars, 3 inches long (1 per jaw); a plurality of saw cut (2.0 in.×2.0 in.) square bars, 4.0 inches long (1 per jaw); and a plurality of saw cut (2.0 in.×2.0 in.) square bars, 8.0 inches long (1 per jaw). The square bar dimensions may vary at least based on the size of the part 5. The hub members 149A and 149B are then formed by milling 0.25 inches off the top of each square bar and drilling and tapping a minimum 1 inch deep, 0.5 inch UNC-13 in the center of each of the hub members 149A and 149B to form the holes 146A and 146B, respectively.

Figure 8:
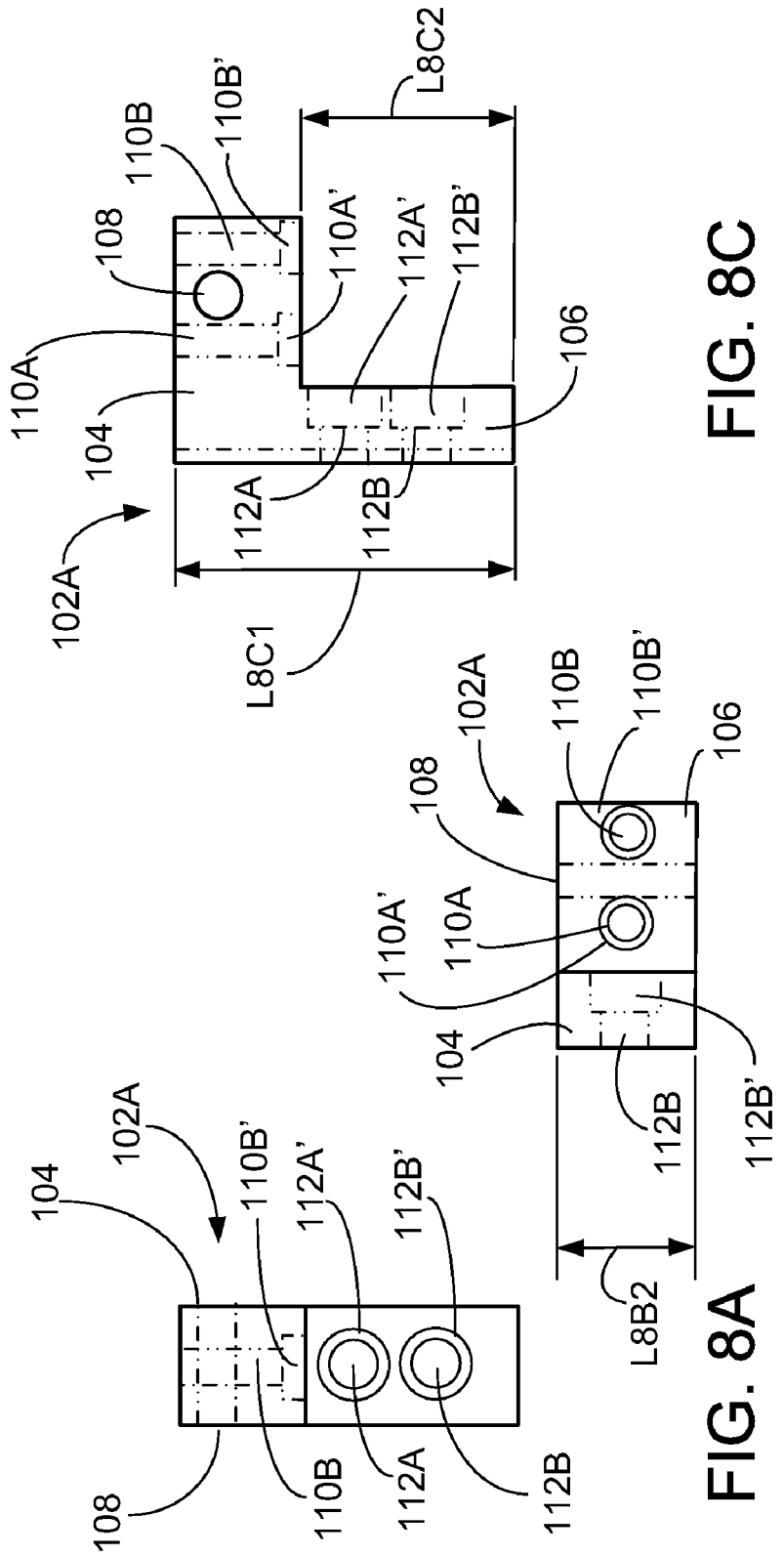
FIGS. 8A, 8B and 8C show views of the master chuck jaws of FIG. 6A or 7.

Referring now to FIGS. 8A, 8B and 8C, the master chuck jaws 102A will now be described. It should be noted that the master chuck jaws will vary according to chuck manufacturer. The master chuck jaws 102A includes an L-shaped member with a first (top) leg 104 and a second leg 106 perpendicular to the first leg 104. The first leg 104 has a pair of through holes 110A and 110B which have a center axis aligned with a vertical plane. The end of the holes 110A and 110B are adjacent to counter sunk cavities 110A' and 110B' which have a generally larger diameter than through holes 110A and 110B. In the FIG. 8B, the relationship between through holes 110A and the counter sunk cavities 110A' is shown as concentric circles.

The second leg 106 has a pair of counter sunk holes 112A and 112B having a center axis aligned with the horizontal plane. In the FIG. 8A, the relationship between through holes 112A and 112B, and the counter sunk cavities 112A' and 112B', is shown as concentric circles. The length of the master chuck jaws 102, denoted as L8C1, is approximately 4.75 inches. The length of the second leg 106, denoted as L8C2, is approximately 3 inches. The width, denoted as L8B2, is approximately 1.94 inches.

The first (top) leg 104 also has a through hole 108 for coupling to the extension arm 120A via bolt 131. The center axis of the hole 108 is perpendicular to the center axes of holes 110A and 110B. Furthermore, the hole 108 is positioned between the holes 110A and 110B.

When manufacturing the master chuck jaws 102A, the material includes a plurality of blocks as required by chuck 12—as wide as a jaw carrier on the chuck face (approx 2 in.)×4.75 in.×4.0 in. or as required by a manufactures' connection carrier. Then, remove by machining 2.75 in.×3.0 in. of material; drill mounting holes 112A as required to match jaw carriers on chuck face; mill necessary connection as required to match jaw carrier on chuck face; and drill and counterbore two 0.5625 inch holes 110A and 110B. Furthermore, drill one 0.5625 inch crosshole (hole 108). The above procedure is repeated for all jaws 102A, 102B and 102C as required.

Figure 21A:
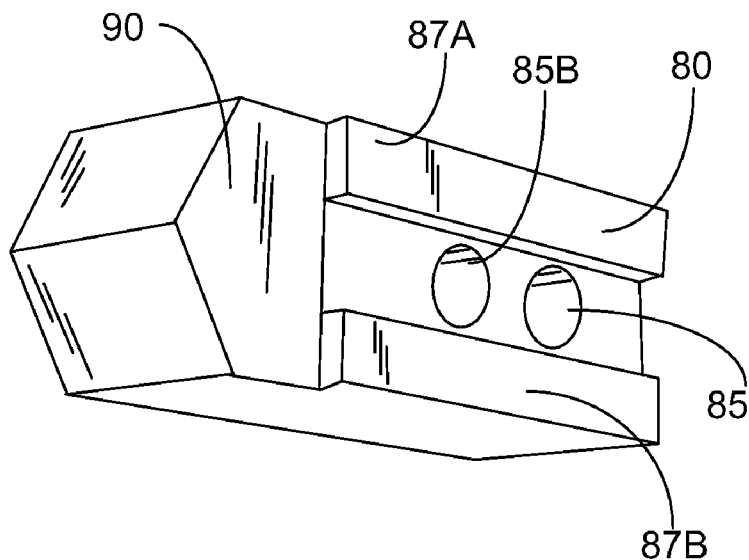
FIGS. 21A, 21B, and 21C show views of a conventional machineable lathe chuck jaw.
Figure 21B:
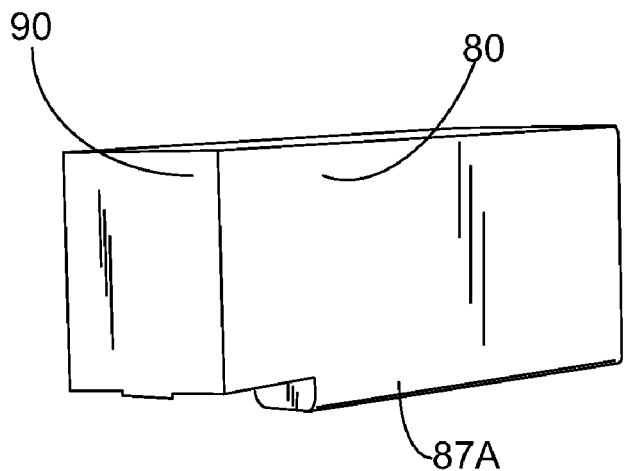
Figure 21C:
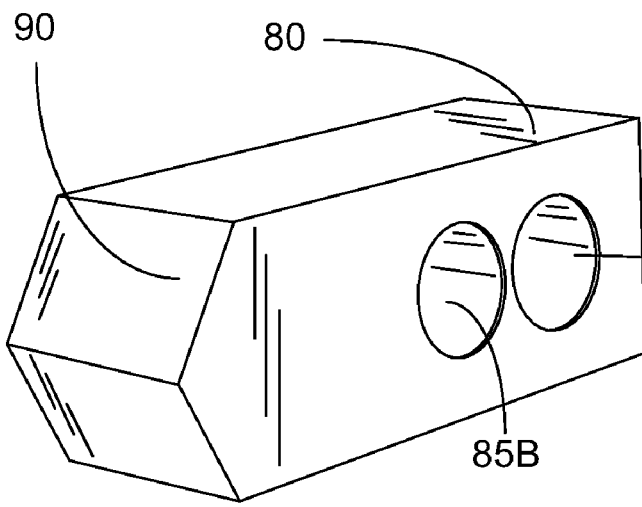

Referring now to FIGS. 21A, 21B and 21C, one example of a conventional master chuck jaw 80 is shown. In this example, the master chuck jaw 80 includes two holes 85A and 85B with a pair of parallel rails 87A and 87B for attachment to a chuck face. One end of the master chuck jaw 80 is tapered and forms a generally triangularly-shaped end 90. The apex of the triangularly-shaped end is adjacent to the outer circumferential surface of a part to be machined.

Figures 25, 26:
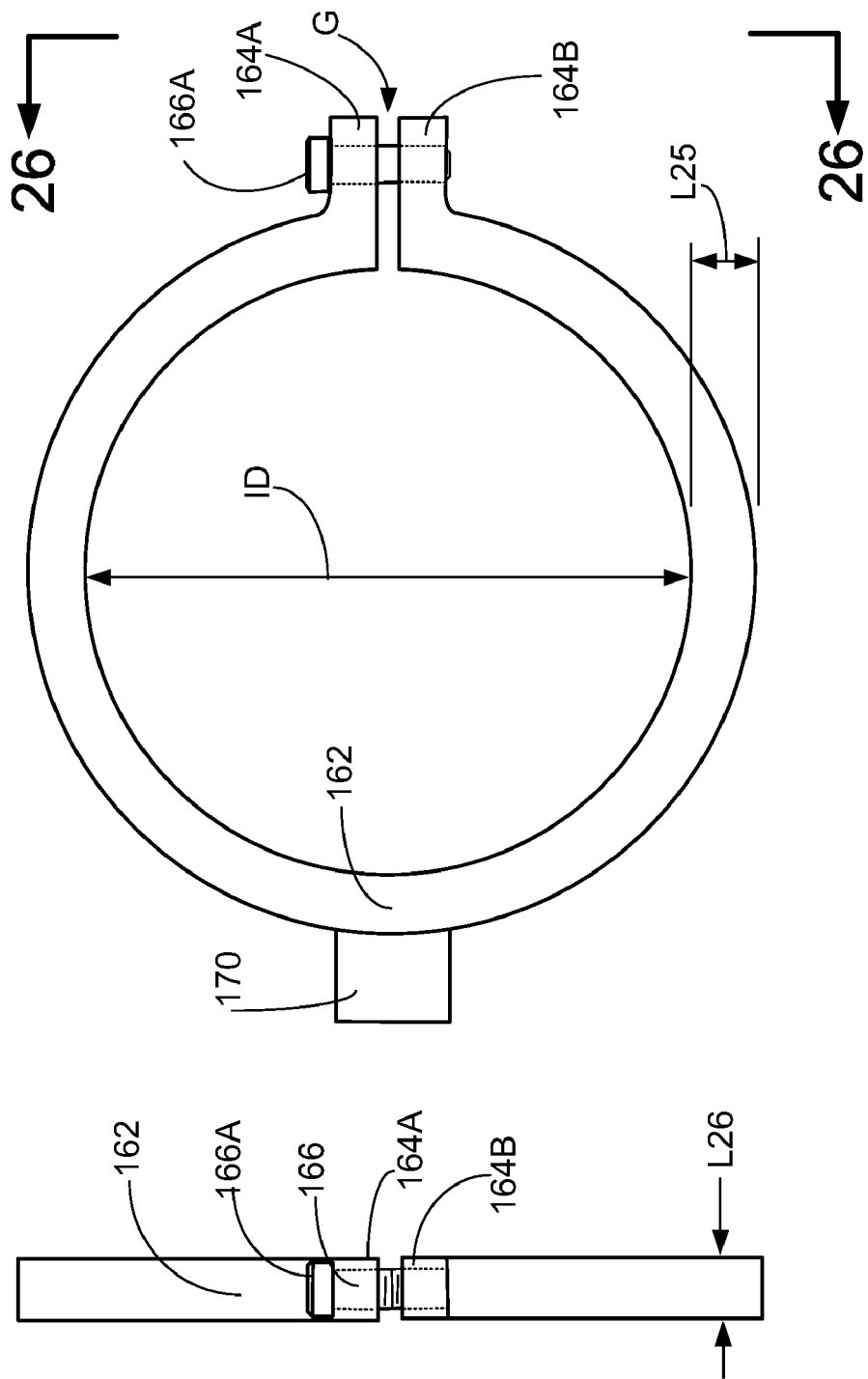
FIG. 25 illustrates a side view of the clamping assembly of FIG. 24.
FIG. 26 shows a view along the plane 26-26 of FIG. 25.
Figure 30:
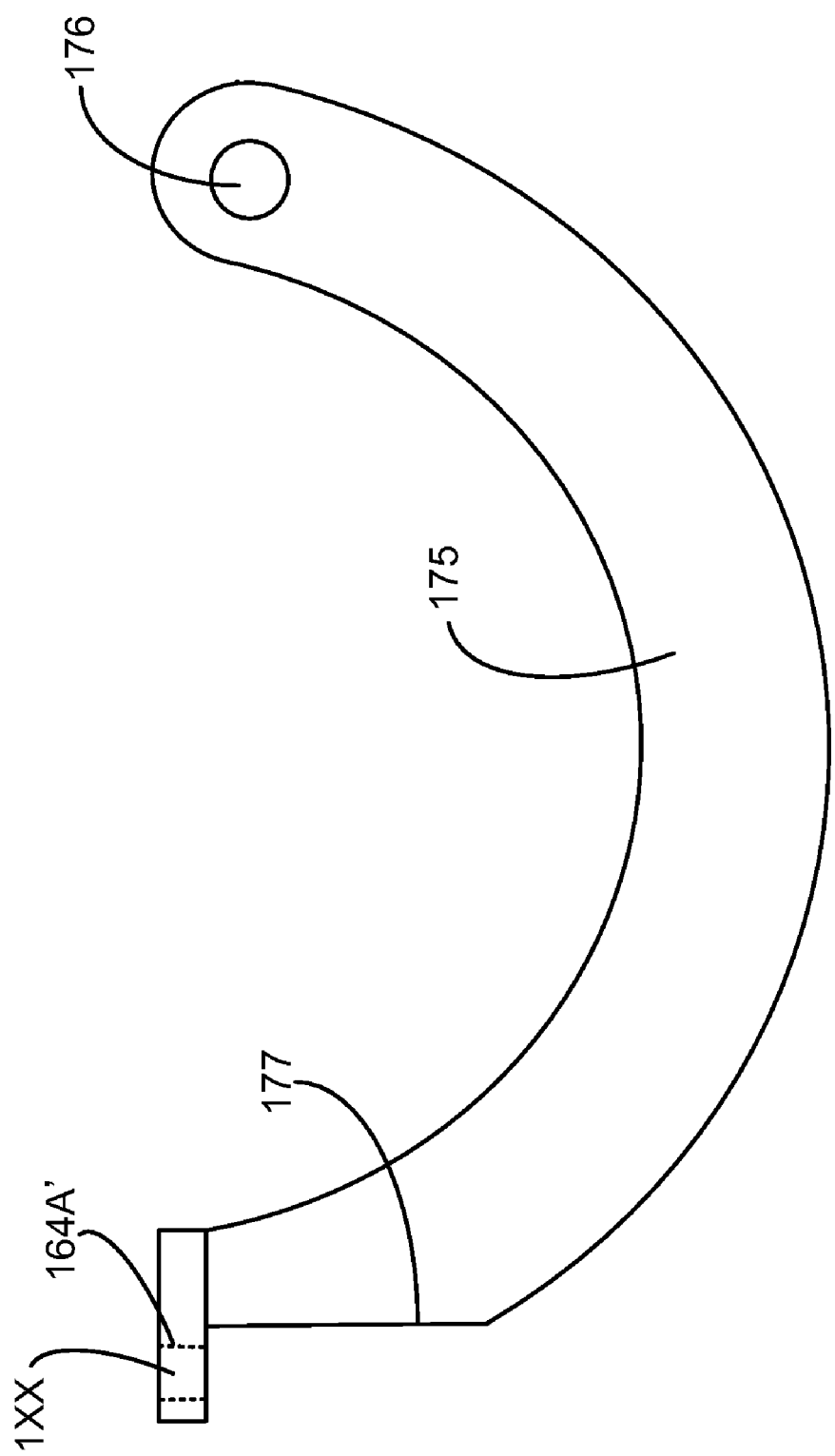
FIG. 30 shows half of the ring structure of FIG. 27.

The deep throat chuck jaw system 100 further includes a clamping assembly. In FIG. 25, a first embodiment of a clamping assembly 160 is shown. In FIG. 27, a second embodiment of the clamping assembly 160' is shown. In general, the clamping assembly 160 or 160' clamps or straps the tabs 144B on each outboard machineable soft jaw 140B to the outer circumferential surface of part 5. The embodiment of FIGS. 6A and 6B employs the clamping assembly 160'.

Figure 24:
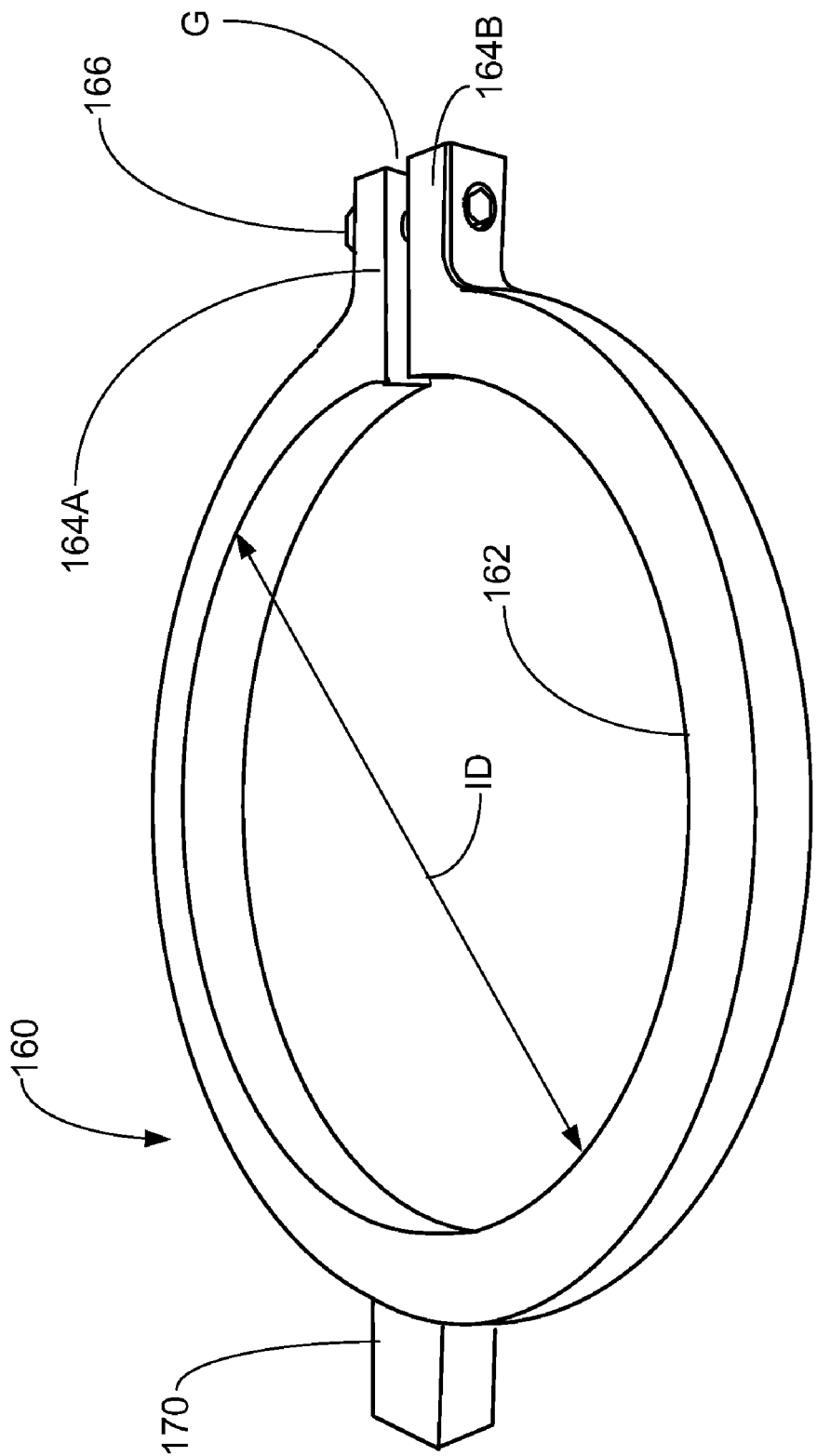
FIG. 24 shows a perspective view of the clamping assembly.

With specific reference to FIGS. 24-26, the clamping assembly 160 includes a ring structure 162 with a break or gap G and radiating flanges 164A and 164B. The flanges 164A and 164B have apertures formed therein to receive bolt 166. The ring structure 162 has a hollow interior defined by the inner diameter ID which swallows the circumference of the part 5 and slides over the tabs 144B. When clamping, the bolt head 166A applies pressure to the flange 164A to reduce the gap G between the flanges 164A and 164B, as the bolt 166 is tightened via a nut 167 (FIG. 6A). Diametrically opposing the flanges 164A and 164B, the ring structure 162 has affixed thereto a balancing weight 170.

The inner diameter ID of the ring structure 162 depends on the turndown on the extension arm outer diameter. The flange 164A has a hole drilled through and aligned with a hole in the flange 164B. The balancing weight 170 is a structure which is approximately 1.5 by 1.875 inches. The height, denoted as L25, of the ring structure 162 is approximately 1 inch. The width, denoted as L26, of the ring structure 162 is approximately 1 inch.

The clamping assembly 160, as best seen in FIGS. 24-26, includes a 1" carbon steel plate with an outside diameter and inside diameter ID appropriate to the diameter of the part 5 to be machined (with 2"×1½" panhandle). The maximum diameter of the clamp swing cannot be larger than the maximum lathe swing capacity (clamping ring). The clamping assembly 160 is secured with a ⅝"×2" Gr8 hexhead cap screw 166 and nut 167.

Figure 33:
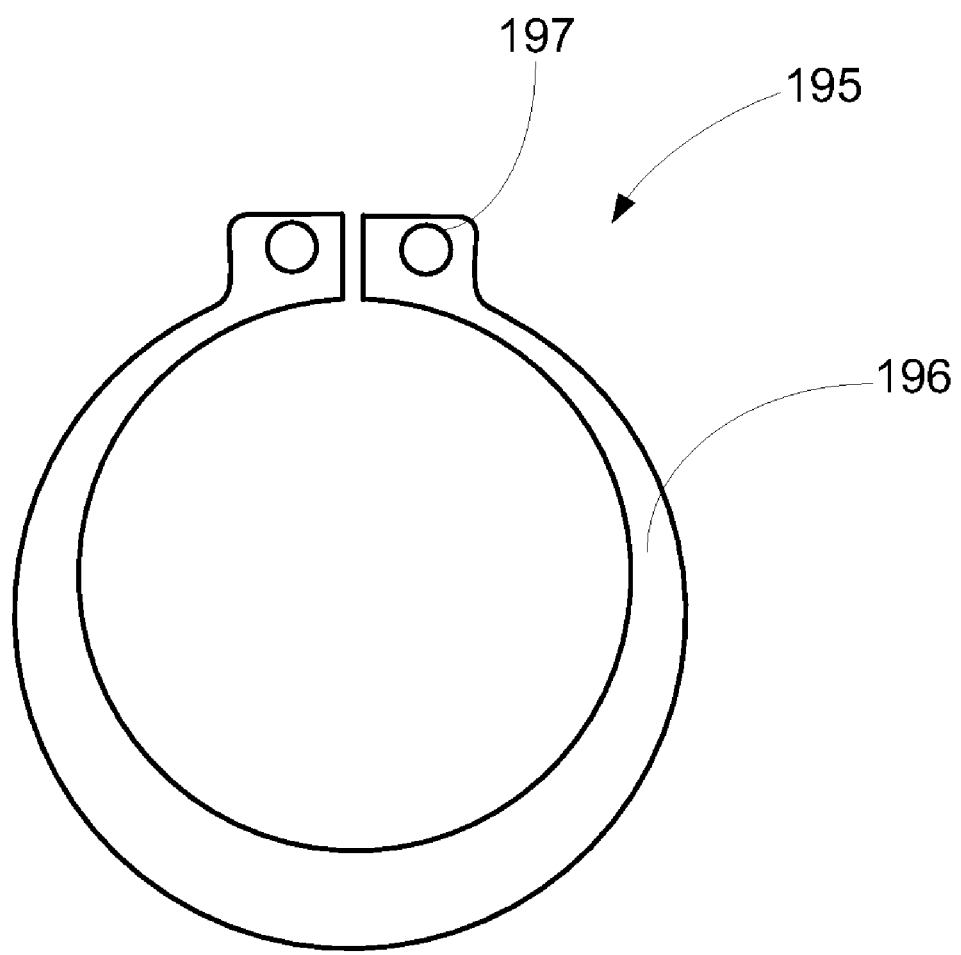
FIG. 33 shows an external snap ring.

Referring now to FIGS. 27-30, the clamping assembly 160' includes a ring structure 162' with a break or gap G' and radiating flanges 164A' and 164B'. The flanges 164A' and 164B' have apertures 1XX formed therein to receive bolt 166. The ring structure 162' has two semi-circular (half) members 175 adapted to be hinged on one side. Since both of the semi-circular members 175 are essentially identical, only one will be described in detail. The other side of members 175 has the flange 164A' and diametrically opposing (the other side) a hole 176 formed therein to receive of a hinge pin 178. A pair of snap rings 195 (FIG. 33) secure the hinge pins 178 in the holes 176 and the hinge plates 190 of the semi-circular members 175. The arrangement of the hinge pins 178 and hinge plates 190 forms a hinge which allows the ring structure 162' to expand. The hinge is positioned diametrically opposing the flanges 164A' and 164B'. In this embodiment, the clamping assembly 160' can be directly closed around the circumference of part 5 and over the tabs 144B. When clamping assembly 160' is in place, the bolt head 166A applies pressure to the flange 164A' to reduce the gap G; between the flanges 164A' and 164B', as the bolt 166 is tightened via nut 167.

On the side with the flange 164A', the curved perimeter of the member 175 is truncated to form a straight surface, denoted as 177, to prevent any protrusion past the outer diameter of the clamping assembly by bolt 166 and flanges 164A' and 164B'.

Figure 31:
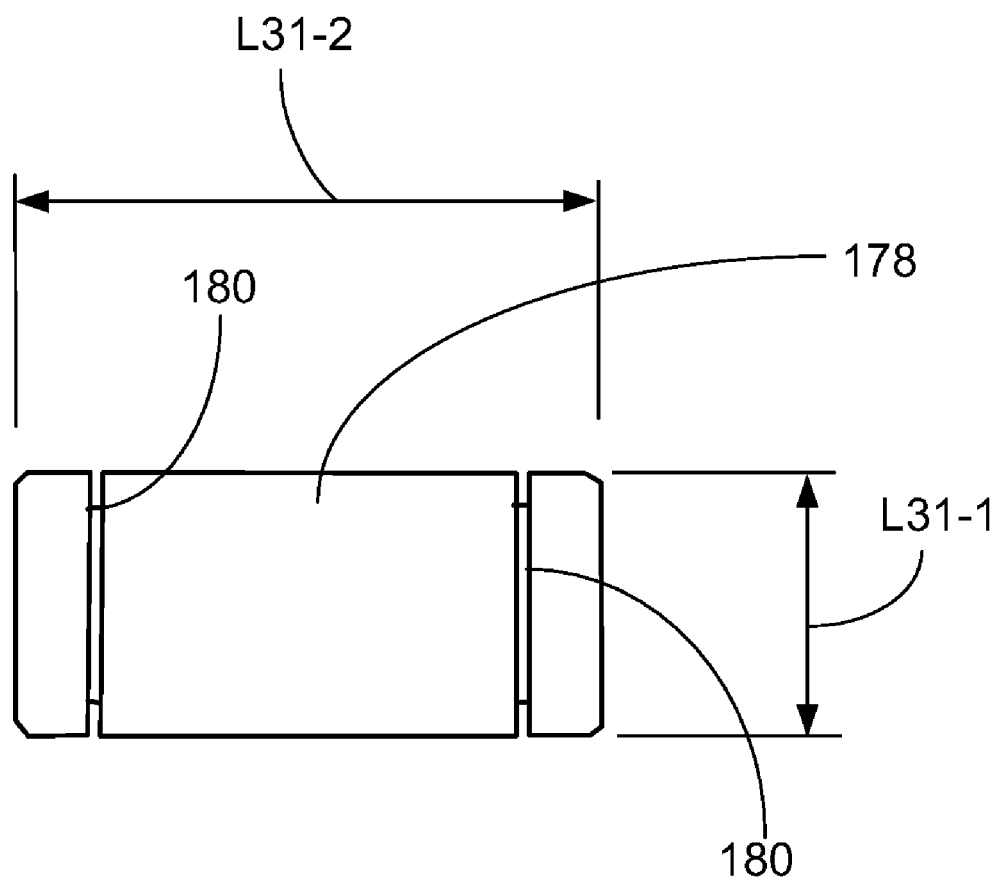
FIG. 31 shows a hinge pin of FIG. 27.

FIG. 31 illustrates the hinge pin 178. The hinge pin 178 has a length, denoted as L31-2, of approximately 1.705 inches. The diameter, denoted as L31-1, of the pin is approximately 0.749 of an inch. A pair of grooves 180 are provided. Each groove 180 is an equal distance from the distal ends of the hinge pin 178. The distance is approximately 0.210 inches. The width of each groove 180 is approximately 0.04 inches. The diameter of each groove 180 is approximately 0.562 inches. These grooves 180 allow for installation of the snap rings 195 (FIG. 33) to secure the hinge (hinge pins 178 and hinge plates 190) onto the ring structure 162'. The snap rings 195 include a snap ring structure 196 with a pair of holes 197 for accepting a snap ring pliers.

Figure 32:
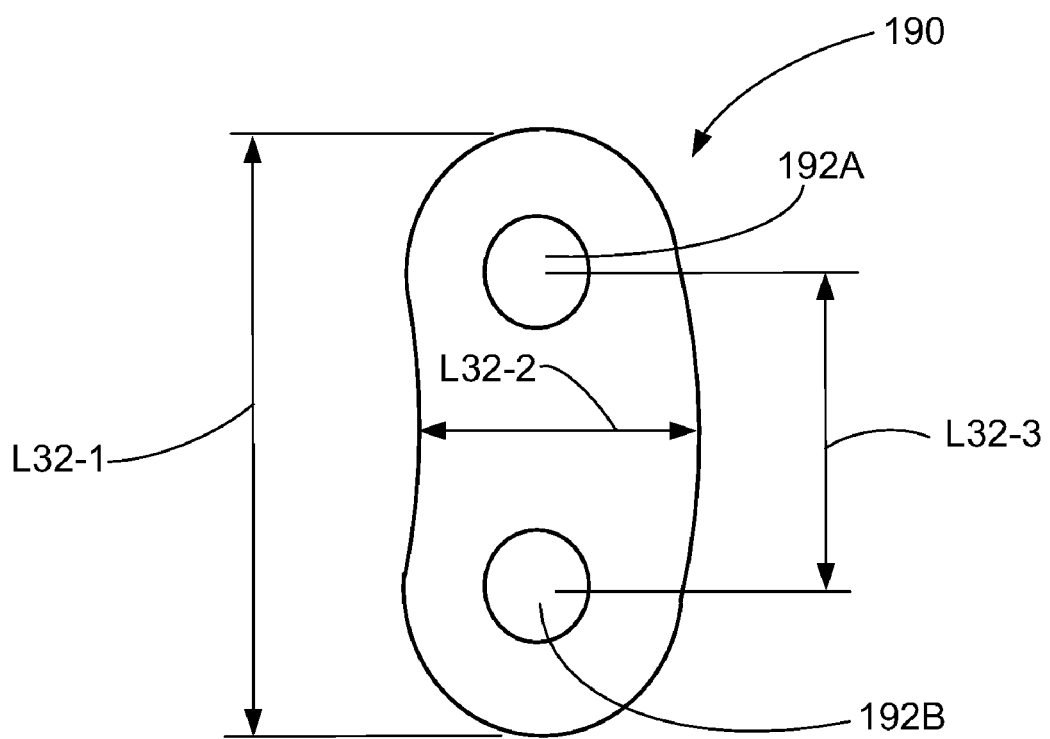
FIG. 32 shows a hinge plate of FIG. 27.

FIG. 32 illustrates the hinge plate 190. The hinge plate 190 has a generally peanut shape or a shape which tracks the contour of the ring structure 162' when hinged together on the hinge side with holes 176. The top and bottom ends of the hinge plate 190 are curved. A pair of apertures 192A and 192B are formed in the hinge plate 190. The length, denoted as L32-1, of the hinge plate 190 is approximately 4.250 inches. The width, denoted as L32-2, of the hinge plate is approximately 2 inches. The distance denoted as L32-3, between the center of the top aperture 192A and the center of the bottom aperture 192B, is approximately 2.250 inches.

The clamping assembly 160' is provided with two half sections which are connected by means of a pivot or hinge (hinge pin 178 and plate 190). A hinge allows the ring structure 162' to be opened or pivoted and then secured by means of a bolt 166 received in the flanges 164A' and 164B' when closed. The ability of the ring structure 162' to pivot open allows the clamping assembly 160' to be easily installed.

Figure 23A:
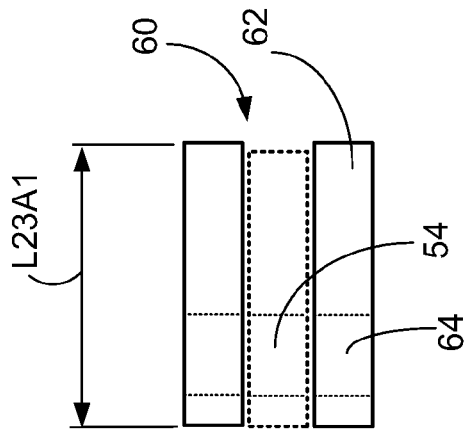
FIGS. 23A and 23B show side and top views of a latch arm.
Figure 23B:
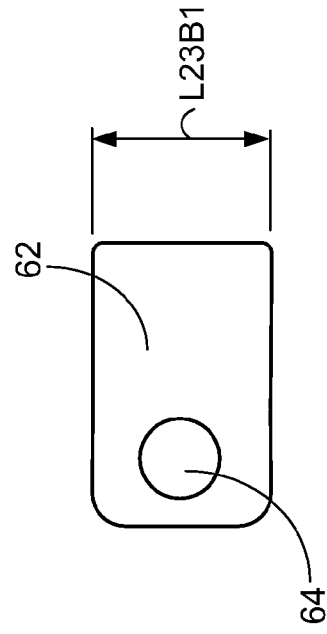
Figure 22A:
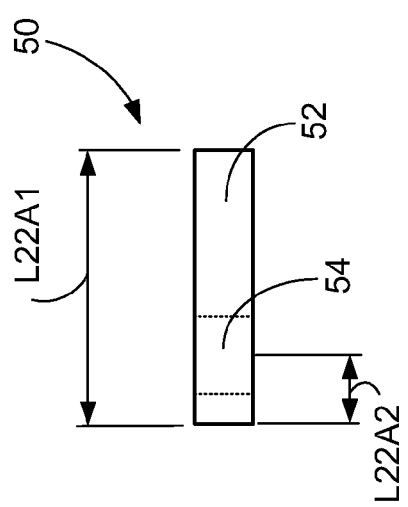
FIGS. 22A and 22B show side and top views of a clamp shim used to manufacture the clamping assembly.
Figure 22B:
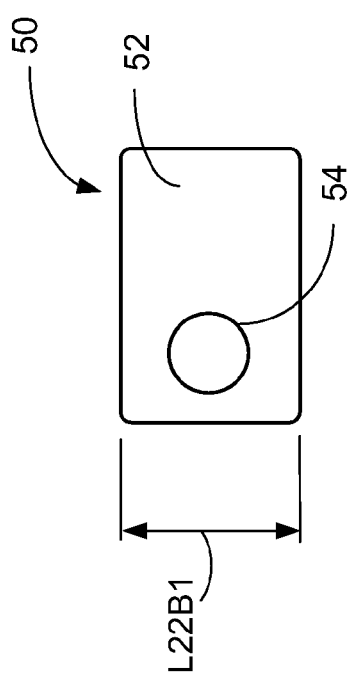

The manufacture of the clamping assembly 160' employs the shim 50 of FIGS. 22A and 22B and the latch arms 60 of FIGS. 23A and 23B. The shim 50 is a rectangular structure 52 with a length, denoted at L22A1, of approximately 2 inches and a width, denoted as L22B1, of approximately 1.5 inches. The distance, denoted as L22A2, is approximately 0.5 of an inch. The length, denoted as L23A1, of the latch arm 60 is approximately 2.062 inches. The width, denoted as L23B1, of the latch arm 60 is 1.5 inches. The latch arm 60 includes two plates 62, with the dimensions of L23A1 and L23B1, which sandwich the shim 50.

The clamping assembly 160' material includes a (0.5 in.× 1.5 in.) carbon steel flatbar×2.0 inches long (latch arms) (3 per clamp—1 acts as shim 50). When manufacturing the recommended maximum size clamping assembly, first cut out a donut with an outside diameter approximately 2 inches larger than the chuck outside diameter and with an inside diameter 4.5 inches smaller than the outside diameter of said donut (for example, a 12 inch chuck=14 in. outside diameter× 9.5 in. inside diameter donut for clamping assembly 160'). Next, find a centerline of the donut and split said donut in half resulting in (2) half circle pieces to form the semi-circular members 175. The dimensions herein are illustrative of the exemplary embodiment. Additional clamping assemblies with varying size can be manufactured to accommodate smaller or larger part sizes.

Next, stack the half-circle pieces (semi-circular members 175), clamp said pieces together, and remove by milling 0.75 inches off one leg of half circle parallel to the center line. This results in one leg of the half circle being shorter than other. Then, remove by milling 1.0 inch of material perpendicular to the previous cut. Next, mill 0.25 inches off the opposite leg. Then, mill a 1 inch radius on the same leg. Thereafter, drill a 0.75 inch hole 176 on radius end; machine a 1.0 inch radius on each end of each 0.25 inch×2.0 inch carbon steel flatbar×4.5 inches long (hinge); drill two (2) 0.75 inch holes 192A and 192B in each hinge plate 190; drill a 0.5625 inch hole in each latch arm 60; and weld one latch arm on each half circle and line up the holes. Thereafter, place one hinge plate 190 on each side of clamping assembly aligning the 0.75 inch holes; install a 0.75 inch bolt in each hole and secure with a nut; align the 0.5625 inch holes 64 in latch arms 60—sandwich extra latch arm (shim) between clamping assembly ends; and install a 0.5 inch bolt through holes 64 of latch arms 60 and hole 54 of shim 50 and secure with a nut. Thereafter, tighten two (2) 0.75 inch nuts and bolts on hinged end of the clamping assembly; bore clamping assembly to 4.0 inches smaller than the outside diameter of clamping assembly resulting in an approximately 2.0 inch clamp wall; and remove shim 50 from between latch arms 60 during clamping assembly use. Thereafter, machine two (2) 0.75 inch hinge pins 178 with snap ring grooves 180; remove the 0.75 inch bolts and nuts from the hinge; and install hinge pins 178 with snap rings 195 in grooves 180.

Figure 10A:
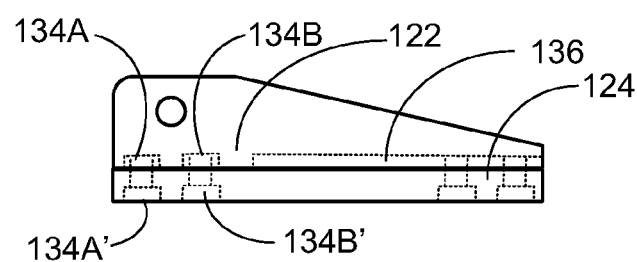
FIGS. 10A and 10B show side and end views of the extension arm.
Figure 10B:
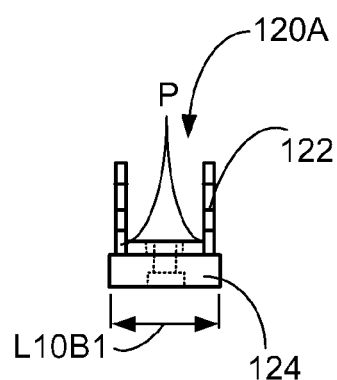
Figure 11A:
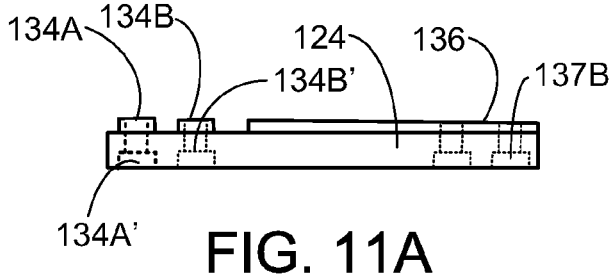
FIGS. 11A, 11B and 11C show side, top and end views of the arm base.
Figure 11C:
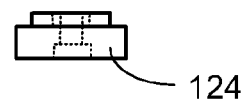
Figure 11B:
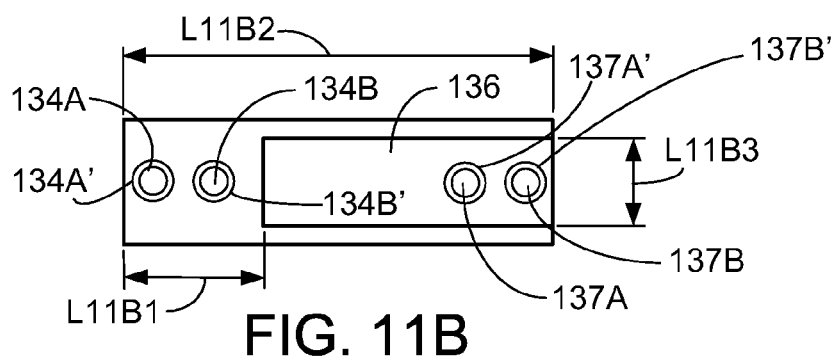
Figure 17A:
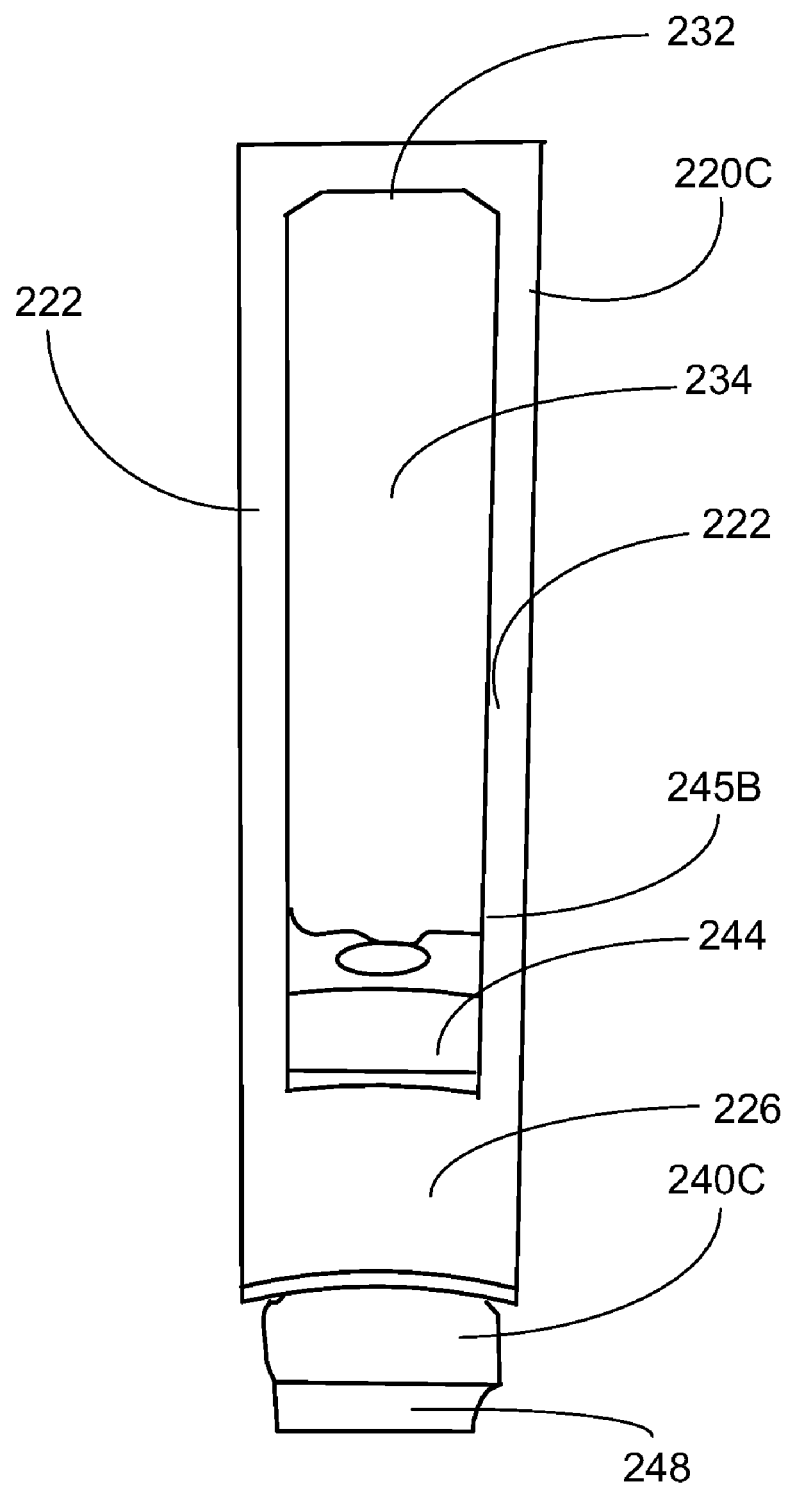
FIGS. 17A and 17B show front and side views of a non-universal flatbar jaw extension member.
Figure 17B:
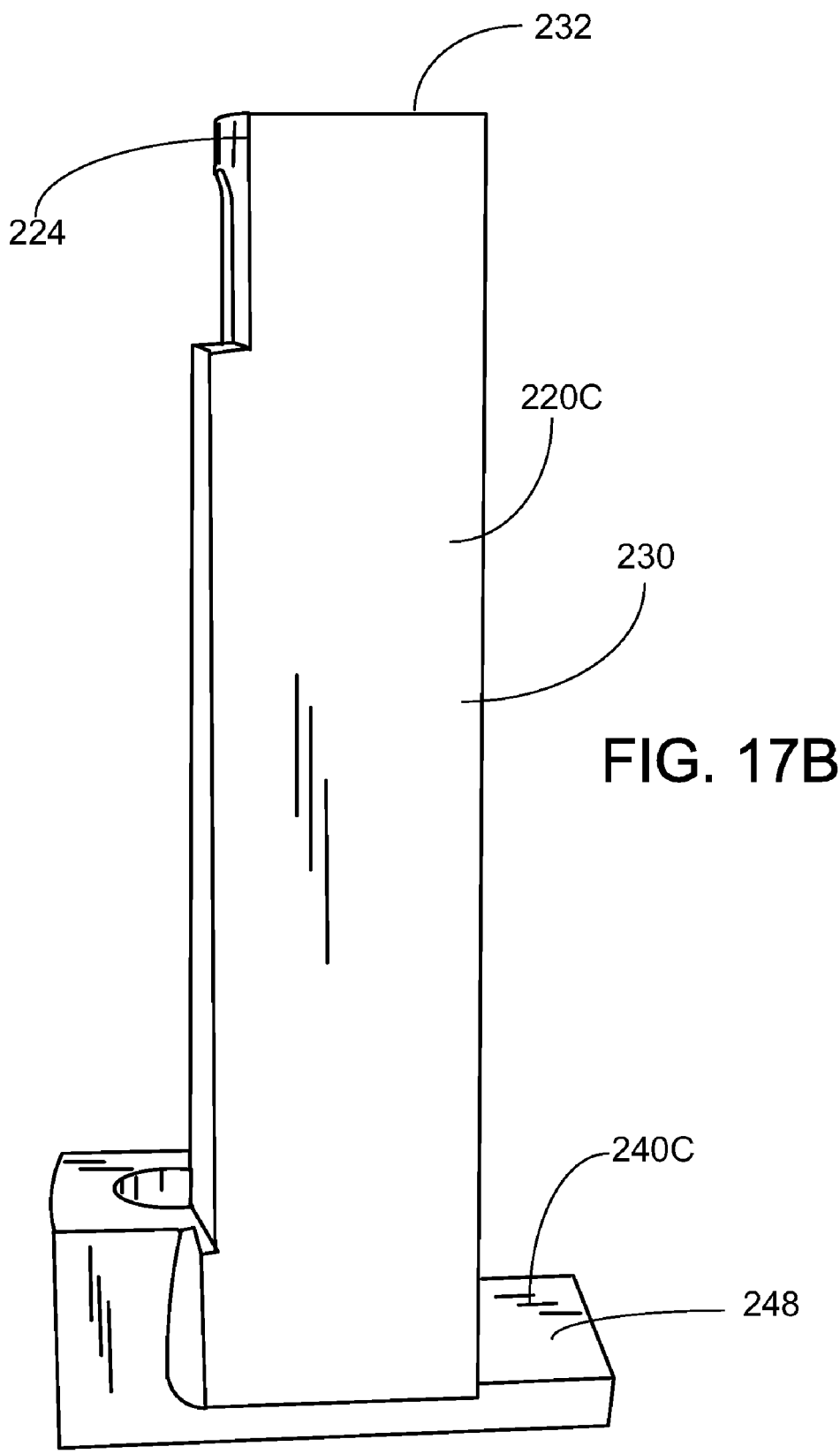

Since each of the jaw extension arms 120A, 120B and 120C are essentially identical; only one such extension arm 120A will be described. The extension arm 120A includes two parallel gussets 122 (FIG. 9) mounted to base 124, as best seen in FIGS. 10A and 10B. FIG. 10B illustrates an end view of the extension arm 120A. Side, top and end views of the base 124 are shown in FIGS. 11A, 11B and 11C, respectively.

Figure 9:
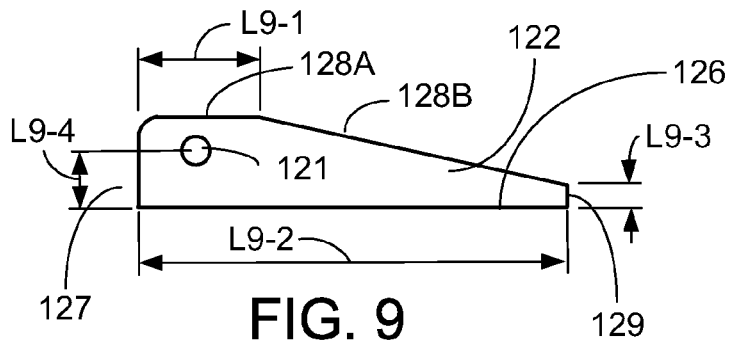
FIG. 9 shows a gusset for an extension arm.

Referring now to FIG. 9, the gusset 122 includes a straight or linear bottom edge 126. An inboard side edge 127 is perpendicular to the bottom edge 126. The top edge of the gusset 122 has two sections. The first section 128A is generally linear or straight and tracks (parallel to) the bottom edge 126. The second section 128B slopes or gradually tapers to a short outboard side edge 129. The gusset 122 has a hole 121 formed therein for attachment to the master chuck jaw 102A via bolt and nut fastener 131 (FIG. 6A-6B).

In the exemplary embodiment, the length, denoted as L9-2, of the bottom edge 126 is approximately 10.750 inches. The length, denoted as L9-1, of the first section 128A is approximately 3.0 inches. The length, denoted as L9-3 of the short outboard side edge 129 is approximately 0.5 inches. The hole 121 is positioned approximately 1.450 inches from the inboard side edge 127. The length, denoted as L9-4, to the hole 121 is approximately 1.25 inches above the bottom edge 126.

Referring now to FIGS. 10A-10B and 11A-11C, the side, top and rear views of the extension arm base 124 is shown. The base 124 includes a generally rectangular-shaped structure having a length denoted as L11B2 of approximately 10.75 inches and a width denoted as L10B1 of 2.75 inches. The base 124 includes a first section having a length, denoted as L11B1, of approximately 3.5 inches with a pair of hub members 134A and 134B (same as the hub members on shim 40). The counter sunk cavities 134A' and 134B' and the hub members 134A and 134B have a center aligned with a center of the width of the base 124. The center of the hub member 134A is displaced by approximately 1.5 inches from the center of the hub member 134B. The center of hub member 134A is approximately 0.7 of an inch from the inboard edge of the base 124. The counter sunk cavities 134A' and 134B' receive the pair of hub members 149A of the first machineable soft jaws 140A to secure the inboard machineable soft jaw 140A to the extension arm 120A. The hub members 149A preferably are friction fit coupled in the counter sunk cavities 134A' and 134B'.

The second section of the base 124 includes a raised landing 136 with a pair of counter sunk cavities 137A' and 137B'. The centers of the through holes 137A and 137B are aligned with the centers of the counter sunk cavities 137A' and 137B'. The width, denoted as L11B3, of the raised landing 136 is approximately 1.94 inches. The through holes 137A and 137B receive fasteners or bolts 130B to secure the outboard machineable soft jaw 140B to the extension arm 120A. The center of the through hole 137B closest to the outboard edge of the base 124 is approximately 0.7 inches from the outboard edge. The distance between the centers of the holes 137A and 137B is approximately 1.5 inches. The length of the raised landing 136 is approximately 7.25 inches. The width of the raised landing 136 is narrower than the width of the base 124 and provides parallel ledges for placement of the gussets 122, as best seen in FIG. 10B. The gussets 122 extend the length of the base 124 and are welded along points P.

Returning now to FIG. 6A, the bolts 130A are received in the through holes 110A and 110B, respectively, through the counter sunk cavity 110A' and 110B'. One hub member 149A is friction fit coupled in cavity 110A'. The other hub member 149A is friction fit coupled in cavity 110B'. The threaded end of the bolt 130A follows the path into the hole 146A below hub member 149A. The bolts 130B also follow a similar path however only one pair of hub members 149B are used.

The hub members 149B secure and couple the second machineable soft jaw 140B to the base 124. The hub members 149A secure and couple the first machineable soft jaw 140A to the base 124. In turn, the hub members 134A and 134B secure and couple the base 124 to the master chuck jaw 102A.

The manufacture of the exemplary jaw extension arms 120A, 120B and 120C will now be described. The material for base 124 includes a (1.0 in.×3.0 in.) carbon steel flatbar 10.875 inches long. The material for gusset 122 includes a (0.25 in.×2.0 in.) carbon steel flatbar 10.75 inches long. The extension arms are milled to a 2.75 inch (+/−0.0625 inch) width for the entire length. Then, 0.25 inches is milled off the top of base 124 leaving two (2) hub members 134A and 134B and a center ridge. Next, a 0.5625 inch hole is drilled in the center of each hub members 134A and 134B and 0.5625 inch holes 137A and 137B are drilled in the center ridge. Holes are also drilled through the hub members 134A and 134B. Next, flip the base 124 over to counter-drill a 0.875 inch (+/−0.001 inch) cavity×0.3125 inches deep centered over each 0.5625 inch hole 137A and 137B (cavities are also required under each 0.5625 inch hole to hub members). Next, burn (0.25 in.×2.0 in.) gussets 122 and drill 0.5625 inch hole 121 in each gusset 122. Fit together, tack and weld gussets 122 onto the base 124 at plane P.

The dimensions of the extension arm will vary depending on the length of the part 5. For example, for an extension arm of 12 inches, the part 5 needs to be greater than 12 inches. The extension arm may vary in dimensions. For example, length of the extension arm may increase or decrease.

Referring now to FIGS. 12A and 12B, the top and side views of a first shim 40 are shown. The use of the shim 40 will be described later in relation to manufacturing of the parts 5. The shim 40 is a generally rectangular shaped plate 42 with a first side length, denoted as L12A1 of 2.9 inches and a second side length, denoted as L12A2, of 2.75 inches. A pair of counter sunk cavities 44A' and 44B' are formed in a bottom surface of plate 42 (only 44A' shown). The first hole is 0.7 from an edge. The distance, denoted as L12A3, between the center of each hole is approximately 1.5 inches. The top surface of the plate 42 has a pair of hub members 44A and 44B aligned with the counter sunk cavities 44A' and 44B'.

The manufacture of the first shims 40 will now be described. The material for the shim 40 is a (1 in.×3 in.×3 in.) carbon steel plate 42. In general, two (2) shims per master chuck jaw 102A or 102B are needed. First, a rectangle is milled. Then, 0.25 inches of the material is milled off a top of the plate 42 leaving two (2) 0.874 inch (+/−0.002 in.) hub members 44A and 44B. Then, each hub member is drilled to form a 0.5625 inch hole through the center. The shims 40 are flipped over and 0.875 inch (+/−0.001 in.) cavities 44A'× 0.3125 inch deep centered over each 0.5625 inch hole of the hub members 44A are counter-drilled. This process is repeated for each shim 40 required.

Figure 7:
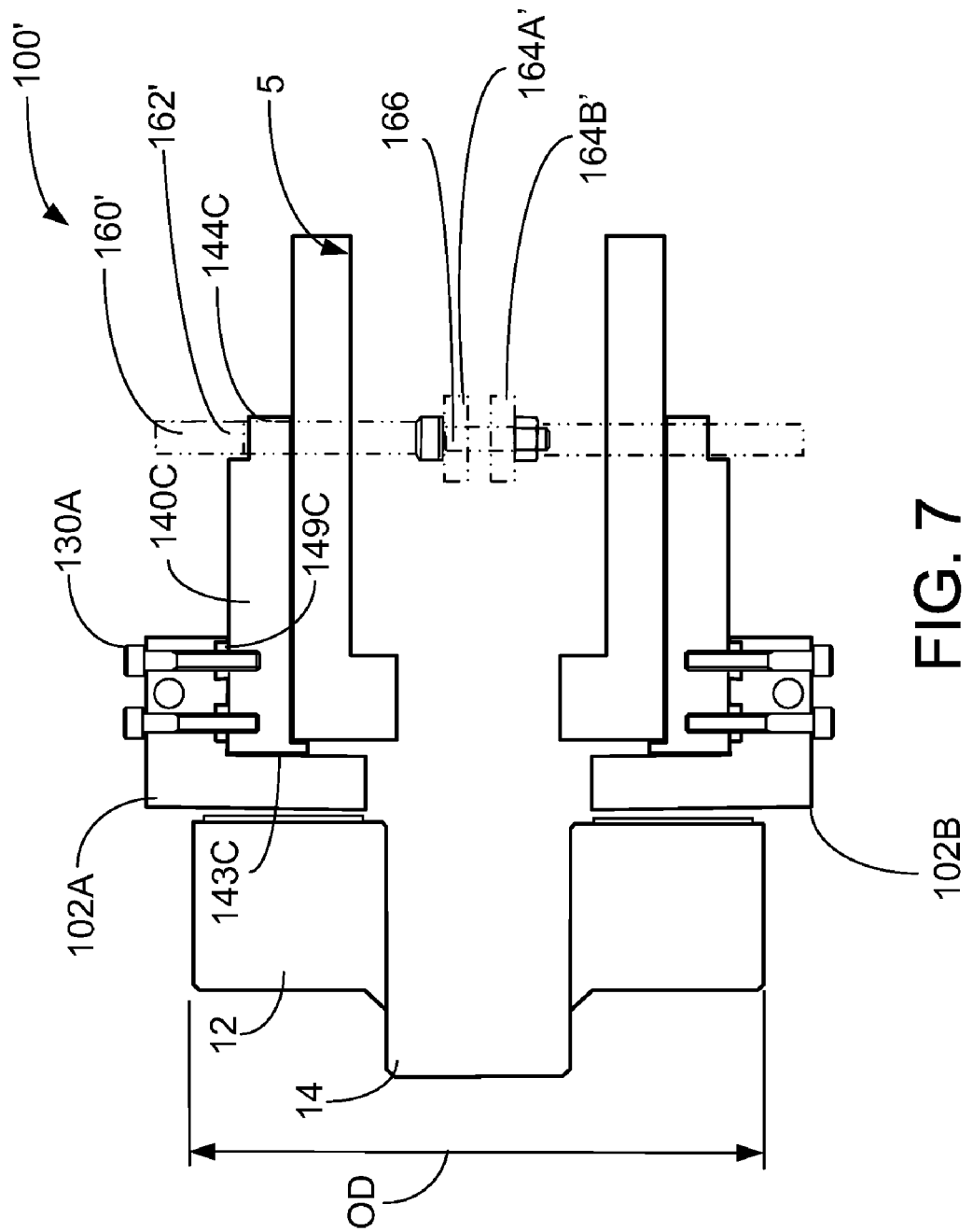
FIG. 7 shows a cross-sectional view of an alternate embodiment of the deep throat chuck jaw system in accordance with the present invention.

The embodiment of FIGS. 6A and 6B is directed to a universal deep throat chuck jaw system 100. With specific reference to FIGS. 7 and 15, an alternate universal deep throat chuck jaw system 100' is shown. The system 100' replaces the extension arms 120A, 120B and 120C and inboard and outboard soft jaws 140A and 140B with an extension machineable soft jaw 140C. The length, denoted as L15-1, of the extension machineable soft jaw piece 140C' is approximately 8 inches. The extension machineable soft jaw 140C is machined to include a tab 144C on the outboard end to clamp the clamping assembly 160 or 160'. The inboard edge of the extension machineable soft jaw 140C has a leg 143C which forms an inboard shoulder for abutting the end of the part 5 when installed to be machined. A pair of hub members 149C is formed to align with the holes in the master chuck jaw for attachment with bolts 130C.

In the present invention, a universal kit can be employed to include system 100 and the extension machineable soft jaw 140C. The extension machineable soft jaw 140C may be used when the part 5 has a length shorter than the length of the extension arms 120A, 120B and 120C of system 100. Furthermore, such a kit may include one or more clamping assemblies 160 or 160' so that various diameters can be accommodated.

Depending on the diameter of the part 5, the height of tab 144B or 144C may be varied. For example, the height of tab 144B is shown lower than the height of tab 144C. Thus, the height of the tab 144B or 144C can be adjusted by machining to match the clamping assembly to an outer diameter of part 5.

Referring to the FIGS. 16, 17A, 17B, 18A, 18B, 19A, 19B, 20A, 20B and 24, the non-universal deep throat chuck jaw system 200 is shown. The non-universal deep throat chuck jaw system 200 includes at least three elongated flatbar extension arms 220A, 220B, 220C coupled to a lathe chuck 12 via a respective one machineable master chuck jaws 240A, 240B and 240C. Since each of the elongated flatbar extension arms 220A, 220B, 220C are essentially identical, only one such elongated flatbar extension arm will be described in detail. With specific reference to FIGS. 17A, 17B, 18A, 18B, the elongated flat bar extension arm 220C includes two (2) pieces (0.5 in.×3 in.) of carbon steel flatbar material with a length, denoted as L18A1, of 12 inches to form parallel sides 222 with a opening 234 therebetween. The elongated flat bar extension arm 220C has an end cap 232 with a thickness denoted as L18A3 of 0.5 inches. Elongated flat bar extension arm 220C is further formed of a (0.5 in.×3 in.) carbon steel flatbar with a height, denoted as L18A2, of 2.5 inches and a width, denoted as L18B1, of 3 inches.

The bottom surface 226 of the sides 222 is curved to the shape of the part 5, as best seen in FIG. 18B. The outboard end of the sides 222 has a step 224 which forms a tab or ledge for placement of the clamping assembly 160 or, alternately 160', to grip and clamp the part 5.

The machineable master chuck jaw 240C is shown in FIGS. 19A and 19B and includes a structure with a pair of aligned counter sunk holes 245A and 245B. The machineable master chuck jaw 240C includes a top section 244 having the first counter sunk hole 245A formed therein. A second section 242 below the top section has the second counter sunk hole 245B and has a length longer than the top section. In general, the relationship between the top and second sections 244 and 242 resembles a step. Below the second section is a third section 243, which forms a step with the second section. The third section 243 is shorter and narrower than the second section 242. Below the third section is a leg member 248 with a width, denoted as L20A1, of approximately 0.5 inches.

In this embodiment, the use of the term "non-universal" is used to denote that the flatbar extension arms 220A, 220B, 220C are not easily adjusted since they do not have machineable soft jaws associated therewith. While not wishing to be bound by theory, if a client has one part to be machined over and over with no variability, the non-universal deep throat chuck jaw system 200 may be preferred.

The manufacture of the system 200 will now be described. The machineable master chuck jaws 240A, 240B, 240C are installed onto the lathe chuck 12. Then, the lathe chuck 12 is activated closed. The jaws 240A, 240B, 240C are bored 3 inches deep, 0.5 inches smaller than the part 5 to be machined (ex: for a 6 in. OD (Outer Diameter) part, bore the jaws to 5.5 in. ID (Inner Diameter)). Then the machineable master chuck jaws 240A, 240B, 240C are marked to match appropriate chuck locations. The machineable master chuck jaws 240A, 240B, 240C are removed from the lathe chuck 12. Thereafter, square up (0.5 in.×3 in.×12 in.) flatbar jaw extensions 220A should be squared up with the jaw bores—one on each side of jaw. Next, tack and weld the top, back and inside. Install (0.5 in.×3 in.×2 in.) flatbar end cap 232 between outboard end of jaw extensions by squaring up, tacking and welding same. Repeat for each of the remaining flatbar jaw extensions 220B and 220C.

Then, the machineable master chuck jaws 240A, 240B, 240C are installed into the lathe chuck 12 (FIG. 6A) in appropriate locations and must be placed in same diameter location used to bore jaws 240A, 240B, 240C originally. Then, the machineable master chuck jaws 240A, 240B, 240C are secured tightly to the lathe chuck 12. Next, bore the flatbar jaw extensions 220A, 220B and 220C back to the chuck's shoulder and/or the same diameter as part 5 to be machined, and turn the outside diameter of the outboard end of the flatbar jaw extensions 220A, 220B and 220C approximately 1.5 inches back to a diameter slightly smaller than the outboard clamping assembly bore. This allows for easy removal of the outboard clamp assembly 160 or 160' when in use.

The manufacture of the clamping assembly 160 will now be described. First, bore the ring structure 162 to a size slightly over the diameter turned on the outboard end of the flatbar jaw extensions 220A, 220B and 220C. Thus, the ring structure 162 is sized to the height of tab 224. In general, the ring structure 162 should be approximately 0.010 inches larger than the turned area (tab 224) of flatbar jaw extensions 220A, 220B and 220C to allow for easy installation and removal while in use. Next, a 0.75 inch hole is drilled in the clamping assembly's panhandle perpendicular to the clamp bore centerline, and a 0.625 inch wide slot is milled in the clamping assembly's panhandle perpendicular to the 0.75 inch drilled hole, cutting the panhandle in half. This allows the bolt 166 to squeeze the clamping assembly 160 tight, reducing the bore of the ring structure 162.

At this point, all components required are manufactured for parts to be machined. Then, the lathe chuck 12 is activated open. Next, the raw material for machined part 5 is installed in flatbar jaw extensions 220A, 220B and 220C up against jaw shoulder denoted at 248. Then, the lathe chuck 12 is activated closed and the clamp assembly 160 is installed on the outboard end of flatbar jaw extensions 220A, 220B and 220C on step or tab 224. Next, the clamping assembly 160 is tightened via bolt 166 and nut 167. Then, the part 5 can be machined as required.

After the machining operation is complete, the clamping assembly 160 is loosened and removed. The lathe chuck 12 is activated open. Next, the machined part 5 is removed. Thereafter, all foreign debris is removed from the chuck and flatbar jaw extensions 220A, 220B and 220C. Hence, the next piece of raw material (part 5) is installed up against jaw shoulder (248). The lathe chuck 12 is activated closed and the clamping assembly 160 installed on outboard end of the flatbar jaw extensions 220A, 220B and 220C. The bolt 166 is tightened and part 5 machined as required.

The process is repeated as required for a production run.

As can be appreciated, the clamping assembly 160 or 160' is a vital part of the deep throat chuck jaw system 100 or 200. The clamping assembly 160 or 160' must apply sufficient radial pressure to the outboard end of the flatbar jaw extensions 220A, 220B and 220C in order to properly retain the part 5 on center for the machining process. Without the clamping assembly 160 or 160', machining parts will not be accomplished.

A description of how to use the universal deep throat chuck jaw system 100 to machine parts 5 with a length exceeding 12 inches will now be described. First, remove the existing jaws from the face of the lathe chuck 12. Place and secure a set of the master chuck jaws 102A, 102B and 102C on the face of the lathe chuck 12 at appropriate diameter for part 5 to be machined. Install shim 40 then inboard machineable soft jaw piece (short jaw) 140A' onto the master chuck jaw 102A and secure with sockethead cap screws 130A. Repeat for each master chuck jaw 102B and 102C. Next, activate the chuck 12 closed to a position appropriate for part 5 to be machined. Then, bore the inboard machineable soft jaws 140A to a diameter equal to the outside diameter of part 5 to be machined. Once machined, the inboard machineable soft jaws 140A are removed from the master chuck jaws 102A, 102B and 102C.

Next, the outboard machineable soft jaws piece 140B' (long jaws) is installed onto the master chuck jaws keeping shim 40 in place. Then, bore outboard machineable soft jaws 140B to a diameter equal to the outside diameter of the part 5 to be machined. Thereafter, turn the outside diameter of the outboard machineable soft jaws 1 inch back to a size equal to the inner diameter ID of the appropriate clamping assembly 160. The outboard machineable soft jaws 140B and shim 40 are removed from the master chuck jaws.

Next, install the extension arms 120A, 120B and 120C and inboard machineable soft jaws 140A previously machined onto the master chuck jaws 102A, 102B and 102C with the extension arms 120A, 120B and 120C between the soft jaws 140A and the master chuck jaws 102A, 102B and 102C. (The extension arms 120A, 120B and 120C are taking the place of the shims.) Next, secure with sockethead cap screws 130A. Repeat for each master chuck jaws.

Next, install the outboard machineable soft jaws 140B previously machined onto outboard end of extension arms 120A, 120B, and 120C and secure with sockethead cap screws 130B. Then, activate the lathe chuck 12 open. Now, the part 5 can be installed and machined. To machine, the chuck 12 is activated closed. Apply a minimum amount of chuck pressure to clamp raw material in place. Next, install the appropriate clamping assembly 160 or 160' onto the outboard end of machineable soft jaws 140B and secure the clamping assembly 160 and 160' tightly. Thereafter, machine the part 5 (raw material) as required. When complete, loosen the clamping assembly 160 or 160' and remove from the outboard end of the machineable soft jaws 140B. Then, activate the lathe chuck 12 open and remove the machined part 5. This process is repeated as required for the production run.

The description below describes how to use the universal deep throat chuck system 100' for parts less than 12 inches in length. Remove existing chuck jaws from chuck face. Next, place and secure master chuck jaw 120A, 120B and 120C on chuck face at appropriate diameter for part 5 to be machined. Thereafter, install the extended machineable soft jaws 140C (FIG. 15) onto master chuck jaws 120A, 120B and 120C and secure with sockethead cap screws 130A. Repeat for each jaw.

Next, activate the lathe chuck 12 closed to a position appropriate for part 5 to be machined. Thereafter, bore the extended machineable soft jaws 140C to a diameter equal to outside diameter of part 5 to be machined. Turn the outside diameter of the outboard end of extended machineable soft jaws 140C 1 inch back to a size equal to the inside diameter of the appropriate clamping assembly 160 or 160'. Thereafter, activate the lathe chuck 12 open and install the raw material to be machined. Next, activate the lathe chuck 12 closed. Apply minimum amount of chuck pressure to clamp raw material in place. Then, install appropriate clamping assembly 160 or 160' onto outboard end of machineable soft jaws 140C and secure clamping assembly 160 or 160' tightly. Machine raw material (part 5) as required. When finished, loosen clamping assembly 160 or 160' on the outboard end of machineable soft jaws 140C. Then, activate chuck 12 open and remove machined part 5. This process is repeated as required.

Results Achieved from Use of Deep Throat Jaws

A Daewoo 300L (long bed) CNC Lathe with a 4 inch headstock hole and 12 inch Kitigawa hydraulic chuck was used to machine parts ranging from 5.5 inches in diameter to 9.625 inches in diameter, measuring up to 24 inches long with 8Rd box and pin threaded connections. The parts also have deep and complex internal bore profiles. The parts were turned using the high end of the tooling manufacturer's recommended speeds and feeds (1,000 surface feet, 0.150 inch depth of cut, 0.016 inches per revolution). The deep throat chuck jaw system was able to very efficiently outperform very large, more expensive hollow spindle lathes making the same parts while maintaining high quality standards.

While not wishing to be bound by theory, the deep throat chuck systems 100, 100' and 200 may be used on lathes with or without a headstock hole 14. Furthermore, with systems 100, 100' and 200, the diameter of the part 5 is not limited to the size of the headstock hole 14 but to the outer diameter (OD) of the chuck 12.

Preferably, the outer diameter of part 5 may be four (4) inches smaller than the OD of the chuck 12. However, with at least systems 100 and 100' a part 5 with an outer diameter equal to the OD of chuck 12 has been machined.

The systems 100, 100' and 200 are constructed and arranged to provide a clamping force via concaved surfaces of the jaw extension members around the part 5 and the clamping assembly 160 or 160'. The "jaw extension members" of system 100 includes the extension arm 120A, 120B or 120C with the first and second machineable soft jaws 140A and 140B. In system 100', the "jaw extension members" only includes the extension machineable soft jaw 140C. The master chuck jaws of systems 100, 100' and 200 provide a means of attachment to a chuck 12.

The systems 100, 100' and 200 are constructed and arranged to provide a greater surface to surface contact between the jaw extension members and the outer surface of the part 5 to be machined.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system for use with a lathe with a headstock hole comprising:
   a set of jaw extension members having an inboard end supported from a face of a master chuck jaw coupled to a lathe chuck and an outboard end, the set of jaw extension members being operable to grip an outer surface of a part having an outer diameter greater than the headstock hole; and
   a clamping assembly operable to clamp around the outboard end, wherein the outboard end includes a tab, wherein each of the jaw extension members includes an extension arm having a base adapted to have coupled thereto an inboard machineable soft jaw and an outboard machineable soft jaw, wherein the outboard machineable soft jaw includes the tab, and wherein a bottom surface of the inboard machineable soft jaw forms an inboard shoulder to abut thereto an end of the part.

2. The system of claim 1, wherein a length of the extension arm determines a distance of the outboard end from the face of the lathe chuck.

3. The system of claim 2, wherein a length of the part is longer than a length of the extension arm.

4. A system for use with a lathe with a headstock hole comprising:
- a set of jaw extension members having an inboard end supported from a face of a master chuck jaw coupled to a lathe chuck and an outboard end, the set of jaw extension members being operable to grip an outer surface of a part having an outer diameter greater than the headstock hole; and
- a clamping assembly operable to clamp around the outboard end;

wherein the clamping assembly includes a ring structure with two ends separated by a gap at a first location, the two ends adapted to be bolted; and a balancing weight at a second location diametrically opposing the first location.

5. A system for use with a lathe with a headstock hole comprising:
- a set of jaw extension members having an inboard end supported from a face of a master chuck jaw coupled to a lathe chuck and an outboard end, the set of jaw extension members being operable to grip an outer surface of a part having an outer diameter greater than the headstock hole; and
- a clamping assembly operable to clamp around the outboard end;

wherein the clamping assembly includes two semi-circular structures hinged together at one location and adapted to be bolted together at a second location diametrically opposing said one location.

6. A system for use with a lathe with a headstock hole comprising:
- a set of jaw extension members having an inboard end supported from a face of a master chuck jaw coupled to a lathe chuck and an outboard end, the set of jaw extension members being operable to grip an outer surface of a part having an outer diameter greater than the headstock hole; and
- a clamping assembly operable to clamp around the outboard end;

wherein each of the jaw extension members includes parallel flatbars with an end bar perpendicular to the flatbars, wherein an outboard end of the flatbars provide a niche for placement of the clamping assembly.

7. A system for use with a lathe without a headstock hole comprising:
- a set of jaw extension members having an inboard end supported from a face of a master chuck jaw coupled to a lathe chuck and an outboard end, the set of jaw extension members being operable to grip an outer surface of a part having an outer diameter less than an outer diameter of the lathe chuck; and
- a clamping assembly operable to clamp around the outboard end without any other outboard support to support the part, wherein the outboard end includes a tab, wherein each of the jaw extension members includes an extension arm having a base adapted to have coupled thereto an inboard machineable soft jaw and an outboard machineable soft jaw, wherein the outboard machineable soft jaw includes the tab, and wherein a bottom surface of the inboard machineable soft jaw forms an inboard shoulder to abut thereto an end of the part.

8. The system of claim 7, wherein a length of the extension arm determines a distance of the outboard end from the face of the lathe chuck.

9. The system of claim 8, wherein a length of the part is longer than the length of the extension arm.

10. A system for use with a lathe without a headstock hole comprising:
- a set of jaw extension members having an inboard end supported from a face of a master chuck jaw coupled to a lathe chuck and an outboard end, the set of jaw extension members being operable to grip an outer surface of a part having an outer diameter less than an outer diameter of the lathe chuck; and
- a clamping assembly operable to clamp around the outboard end without any other outboard support to support the part;
- wherein each of the jaw extension members includes parallel flatbars with an end bar perpendicular to the flatbars, wherein an outboard end of the flatbars provide a niche for placement of the clamping assembly.

11. A system for use with a lathe without a headstock hole comprising:
- a set of jaw extension members having an inboard end supported from a face of a master chuck jaw coupled to a lathe chuck and an outboard end, the set of jaw extension members being operable to grip an outer surface of a part having an outer diameter less than an outer diameter of the lathe chuck; and
- a clamping assembly operable to clamp around the outboard end without any other outboard support to support the part;
- wherein the clamping assembly includes a ring structure with two ends separated by a gap at a first location, the two ends adapted to be bolted; and a balancing weight at a second location diametrically opposing the first location.

12. A system for use with a lathe without a headstock hole comprising:
- a set of jaw extension members having an inboard end supported from a face of a master chuck jaw coupled to a lathe chuck and an outboard end, the set of jaw extension members being operable to grip an outer surface of a part having an outer diameter less than an outer diameter of the lathe chuck; and
- a clamping assembly operable to clamp around the outboard end without any other outboard support to support the part;
- wherein the clamping assembly includes two semi-circular structures hinged together at one location and adapted to be bolted together at a second location diametrically opposing said one location.

13. A system comprising:
- means for gripping an outer surface of a part having an outer diameter greater than a headstock hole and adapted to be coupled from an inbound end to a face of a master chuck jaw coupled to a lathe chuck; and
- means for clamping around an outboard end of the gripping means;
- wherein the outboard end includes a tab, and wherein a bottom surface of the inboard machineable soft jaw forms an inboard shoulder to abut thereto an end of the part.

14. A system comprising:
- means for gripping an outer surface of a part having an outer diameter greater than a headstock hole and adapted to be coupled from an inbound end to a face of a master chuck jaw coupled to a lathe chuck; and means for clamping around an outboard end of the gripping means;

wherein the outboard end includes a tab, and wherein the gripping means comprises a set of jaw extension members, each of the jaw extension members includes parallel flatbars with an end bar perpendicular to the flatbars, wherein an outboard end of the flatbars provide a niche for placement of the clamping means.

15. A system comprising:

means for gripping an outer surface of a part having an outer diameter greater than a headstock hole and adapted to be coupled from an inbound end to a face of a master chuck jaw coupled to a lathe chuck; and means for clamping around an outboard end of the gripping means;

wherein the clamping means includes a ring structure with two ends separated by a gap at a first location, the two ends adapted to be bolted; and means for balancing a weight of the ring structure at a second location diametrically opposing the first location.

16. A system comprising:

means for gripping an outer surface of a part having an outer diameter greater than a headstock hole and adapted to be coupled from an inbound end to a face of a master chuck jaw coupled to a lathe chuck; and means for clamping around an outboard end of the gripping means;

wherein the clamping means includes two semi-circular structures hinged together at one location and means for fastening the two semi-circular structures together at a second location diametrically opposing said one location.

17. A system comprising:

means for gripping an outer surface of a part having an outer diameter less than an outer diameter of the lathe chuck and adapted to be coupled from an inbound end to a face of a master chuck jaw coupled to a lathe chuck; and means for clamping around an outboard end of the gripping means;

wherein the outboard end includes a tab, wherein the gripping means comprises a set of jaw extension members, each of the jaw extension members includes an extension arm having a base adapted to have coupled thereto an inboard machineable soft jaw and an outboard machineable soft jaw, wherein the outboard machineable soft jaw includes the tab, and wherein a bottom surface of the inboard machineable soft jaw forms an inboard shoulder to abut thereto an end of the part.

18. The system of claim 17, wherein a length of the extension arm determines a distance of the outboard end from the face of the lathe chuck.

19. The system of claim 18, wherein a length of the part is longer than a length of the extension arm.

20. A system comprising:

means for gripping an outer surface of a part having an outer diameter less than an outer diameter of the lathe chuck and adapted to be coupled from an inbound end to a face of a master chuck jaw coupled to a lathe chuck; and means for clamping around an outboard end of the gripping means;

wherein the outboard end includes a tab, and wherein the gripping means comprises a set of jaw extension members, each of the jaw extension members includes parallel flatbars with an end bar perpendicular to the flatbars, wherein an outboard end of the flatbars provide a niche for placement of the clamping means.

21. A system comprising:

means for gripping an outer surface of a part having an outer diameter less than an outer diameter of the lathe chuck and adapted to be coupled from an inbound end to a face of a master chuck jaw coupled to a lathe chuck; and means for clamping around an outboard end of the gripping means;

wherein the clamping means includes a ring structure with two ends separated by a gap at a first location, the two ends adapted to be bolted; and means for balancing a weight of the ring structure at a second location diametrically opposing the first location.

22. A system comprising:

means for gripping an outer surface of a part having an outer diameter less than an outer diameter of the lathe chuck and adapted to be coupled from an inbound end to a face of a master chuck jaw coupled to a lathe chuck; and means for clamping around an outboard end of the gripping means;

wherein the clamping means includes two semi-circular structures hinged together at one location and means for fastening the two semi-circular structures together at a second location diametrically opposing said one location.

23. A kit comprising:

a first set of jaw extension members having an inboard end supported from a face of a master chuck jaw coupled to a lathe chuck and an outboard end, the set of jaw extension members being operable to grip an outer surface of a part having a first part length and an outer diameter less than an outer diameter of the lathe chuck;

a second set of jaw extension members having an inboard end supported from a face of a master chuck jaw coupled to a lathe chuck and an outboard end, the set of jaw extension members being operable to grip an outer surface of a part having a second part length smaller than the first part length and an outer diameter less than the outer diameter of the lathe chuck; and at least one clamping assembly operable to clamp around the outboard end of the first set of jaw extension members or the second set of jaw extension members.

24. A kit for use with a lathe with a headstock hole comprising:

a first set of jaw extension members having an inboard end supported from a face of a master chuck jaw coupled to a lathe chuck and an outboard end, the set of jaw extension members being operable to grip an outer surface of a part having a first part length and an outer diameter greater than the headstock hole and less than an outer diameter of the lathe chuck;

a second set of jaw extension members having an inboard end supported from a face of a master chuck jaw coupled to a lathe chuck and an outboard end, the set of jaw extension members being operable to grip an outer surface of a part having a second part length smaller than the first part length and an outer diameter greater than the headstock hole and less than the outer diameter of the lathe chuck; and at least one clamping assembly operable to clamp around the outboard end of the first set of jaw extension members or the second set of jaw extension members.

25. The system of claim 4, wherein the outboard end includes a tab.

26. The system of claim 25, wherein each of the jaw extension members includes an extension arm having a base adapted to have coupled thereto an inboard machineable soft jaw and an outboard machineable soft jaw, and wherein the outboard machineable soft jaw includes the tab.

27. The system of claim 25, wherein a length of the extension arm determines a distance of the outboard end from the face of the lathe chuck.

28. The system of claim 27, wherein a length of the part is longer than a length of the extension arm.

29. The system of claim 5, wherein the outboard end includes a tab.

30. The system of claim 29, wherein each of the jaw extension members includes an extension arm having a base adapted to have coupled thereto an inboard machineable soft jaw and an outboard machineable soft jaw, and wherein the outboard machineable soft jaw includes the tab.

31. The system of claim 29, wherein a length of the extension arm determines a distance of the outboard end from the face of the lathe chuck.

32. The system of claim 31, wherein a length of the part is longer than a length of the extension arm.

33. The system of claim 6, wherein the outboard end includes a tab.

34. The system of claim 33, wherein each of the jaw extension members includes an extension arm having a base adapted to have coupled thereto an inboard machineable soft jaw and an outboard machineable soft jaw, and wherein the outboard machineable soft jaw includes the tab.

35. The system of claim 33, wherein a length of the extension arm determines a distance of the outboard end from the face of the lathe chuck.

36. The system of claim 35, wherein a length of the part is longer than a length of the extension arm.

37. The system of claim 10, wherein the outboard end includes a tab.

38. The system of claim 37, wherein each of the jaw extension members includes an extension arm having a base adapted to have coupled thereto an inboard machineable soft jaw and an outboard machineable soft jaw, and wherein the outboard machineable soft jaw includes the tab.

39. The system of claim 37, wherein a length of the extension arm determines a distance of the outboard end from the face of the lathe chuck.

40. The system of claim 39, wherein a length of the part is longer than the length of the extension arm.

41. The system of claim 11, wherein the outboard end includes a tab.

42. The system of claim 41, wherein each of the jaw extension members includes an extension arm having a base adapted to have coupled thereto an inboard machineable soft jaw and an outboard machineable soft jaw, and wherein the outboard machineable soft jaw includes the tab.

43. The system of claim 41, wherein a length of the extension arm determines a distance of the outboard end from the face of the lathe chuck.

44. The system of claim 43, wherein a length of the part is longer than the length of the extension arm.

45. The system of claim 12, wherein the outboard end includes a tab.

46. The system of claim 45, wherein each of the jaw extension members includes an extension arm having a base adapted to have coupled thereto an inboard machineable soft jaw and an outboard machineable soft jaw, and wherein the outboard machineable soft jaw includes the tab.

47. The system of claim 45, wherein a length of the extension arm determines a distance of the outboard end from the face of the lathe chuck.

48. The system of claim 47, wherein a length of the part is longer than the length of the extension arm.

49. The system of claim 15, wherein the gripping means comprises a set of jaw extension members, each of the jaw extension members includes an extension arm having a base adapted to have coupled thereto an inboard machineable soft jaw and an outboard machineable soft jaw, and wherein the outboard machineable soft jaw includes a tab.

50. The system of claim 49, wherein a length of the extension arm determines a distance of the outboard end from the face of the lathe chuck.

51. The system of claim 50, wherein a length of the part is longer than a length of the extension arm.

52. The system of claim 15, wherein the gripping means comprises a set of jaw extension members, each of the jaw extension members includes an elongated machineable soft jaw having the outboard end which includes a tab.

53. The system of claim 52, wherein a length of the elongated machineable soft jaw determines a distance of the outboard end from the face of the lathe chuck.

54. The system of claim 16, wherein the gripping means comprises a set of jaw extension members, each of the jaw extension members includes an extension arm having a base adapted to have coupled thereto an inboard machineable soft jaw and an outboard machineable soft jaw, and wherein the outboard machineable soft jaw includes a tab.

55. The system of claim 54, wherein a length of the extension arm determines a distance of the outboard end from the face of the lathe chuck.

56. The system of claim 55, wherein a length of the part is longer than a length of the extension arm.

57. The system of claim 16, wherein the gripping means comprises a set of jaw extension members, each of the jaw extension members includes an elongated machineable soft jaw having the outboard end which includes a tab.

58. The system of claim 57, wherein a length of the elongated machineable soft jaw determines a distance of the outboard end from the face of the lathe chuck.

59. The system of claim 21, wherein the gripping means comprises a set of jaw extension members, each of the jaw extension members includes an elongated machineable soft jaw having the outboard end which includes a tab.

60. The system of claim 59, wherein a length of the elongated machineable soft jaw determines a distance of the outboard end from the face of the lathe chuck.

61. The system of claim 21, wherein the outboard end includes a tab.

62. The system of claim 21, wherein the gripping means comprises a set of jaw extension members, each of the jaw extension members includes an extension arm having a base adapted to have coupled thereto an inboard machineable soft jaw and an outboard machineable soft jaw, and wherein the outboard machineable soft jaw includes the tab.

63. The system of claim 62, wherein a length of the extension arm determines a distance of the outboard end from the face of the lathe chuck.

64. The system of claim 63, wherein a length of the part is longer than a length of the extension arm.

65. The system of claim 22, wherein the gripping means comprises a set of jaw extension members, each of the jaw extension members includes an elongated machineable soft jaw having the outboard end which includes a tab.

66. The system of claim 65, wherein a length of the elongated machineable soft jaw determines a distance of the outboard end from the face of the lathe chuck.

67. The system of claim 22, wherein the outboard end includes a tab.

68. The system of claim 67, wherein the gripping means comprises a set of jaw extension members, each of the jaw extension members includes an extension arm having a base adapted to have coupled thereto an inboard machineable soft jaw and an outboard machineable soft jaw, and wherein the outboard machineable soft jaw includes the tab.

69. The system of claim 68, wherein a length of the extension arm determines a distance of the outboard end from the face of the lathe chuck.

70. The system of claim 69, wherein a length of the part is longer than a length of the extension arm.

* * * * *